(12) United States Patent
Ishihara

(10) Patent No.: US 10,883,401 B2
(45) Date of Patent: Jan. 5, 2021

(54) EXHAUST GAS PURIFICATION FILTER

(71) Applicant: DENSO CORPORATION, Kariya (JP)

(72) Inventor: Mikio Ishihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/711,700

(22) Filed: Dec. 12, 2019

(65) Prior Publication Data

US 2020/0116059 A1    Apr. 16, 2020

Related U.S. Application Data

(63) Continuation of application No. PCT/JP2018/022605, filed on Jun. 13, 2018.

(30) Foreign Application Priority Data

Jun. 13, 2017  (JP) .................................. 2017-115978

(51) Int. Cl.
*F01N 3/022*  (2006.01)
*F01N 3/28*  (2006.01)

(52) U.S. Cl.
CPC ......... *F01N 3/0222* (2013.01); *F01N 3/2803* (2013.01)

(58) Field of Classification Search
None
See application file for complete search history.

(56) References Cited

U.S. PATENT DOCUMENTS

| | | | |
|---|---|---|---|
| 2007/0033912 A1* | 2/2007 | Furukawa | C04B 38/0006 55/523 |
| 2007/0225149 A1 | 9/2007 | Hayashi et al. | |
| 2009/0220734 A1* | 9/2009 | Backhaus-Ricoult | C04B 38/0006 428/116 |
| 2010/0222213 A1* | 9/2010 | Ohno | B01D 46/2455 502/332 |
| 2012/0317947 A1 | 12/2012 | Okazaki | |
| 2013/0145735 A1 | 6/2013 | Motoki et al. | |
| 2014/0103560 A1 | 4/2014 | Okazaki | |

FOREIGN PATENT DOCUMENTS

| | | |
|---|---|---|
| EP | 0 753 490 | 1/1997 |
| JP | 2008-037722 | 2/2008 |
| WO | 01/91882 | 12/2001 |

* cited by examiner

*Primary Examiner* — David Sample
*Assistant Examiner* — Elizabeth Collister
(74) *Attorney, Agent, or Firm* — Nixon & Vanderhye PC

(57) ABSTRACT

An exhaust gas purification filter comprises: a casing; a porous dividing wall which partitions the inside of the casing into a honeycomb shape; and cells enclosed by the dividing wall. A pore path length distribution of the dividing wall, when expressed by a frequency histogram per 10 μm of the pore path length of the dividing wall, has an integrated frequency of at least 58%. The integrated frequency is a maximum value of a value obtained by summing the frequencies of a total of three adjacent levels which include the maximum peak frequency. The dividing wall preferably has a gas permeability coefficient k of at least $0.8 \times 10^{-12}$ m².

3 Claims, 17 Drawing Sheets

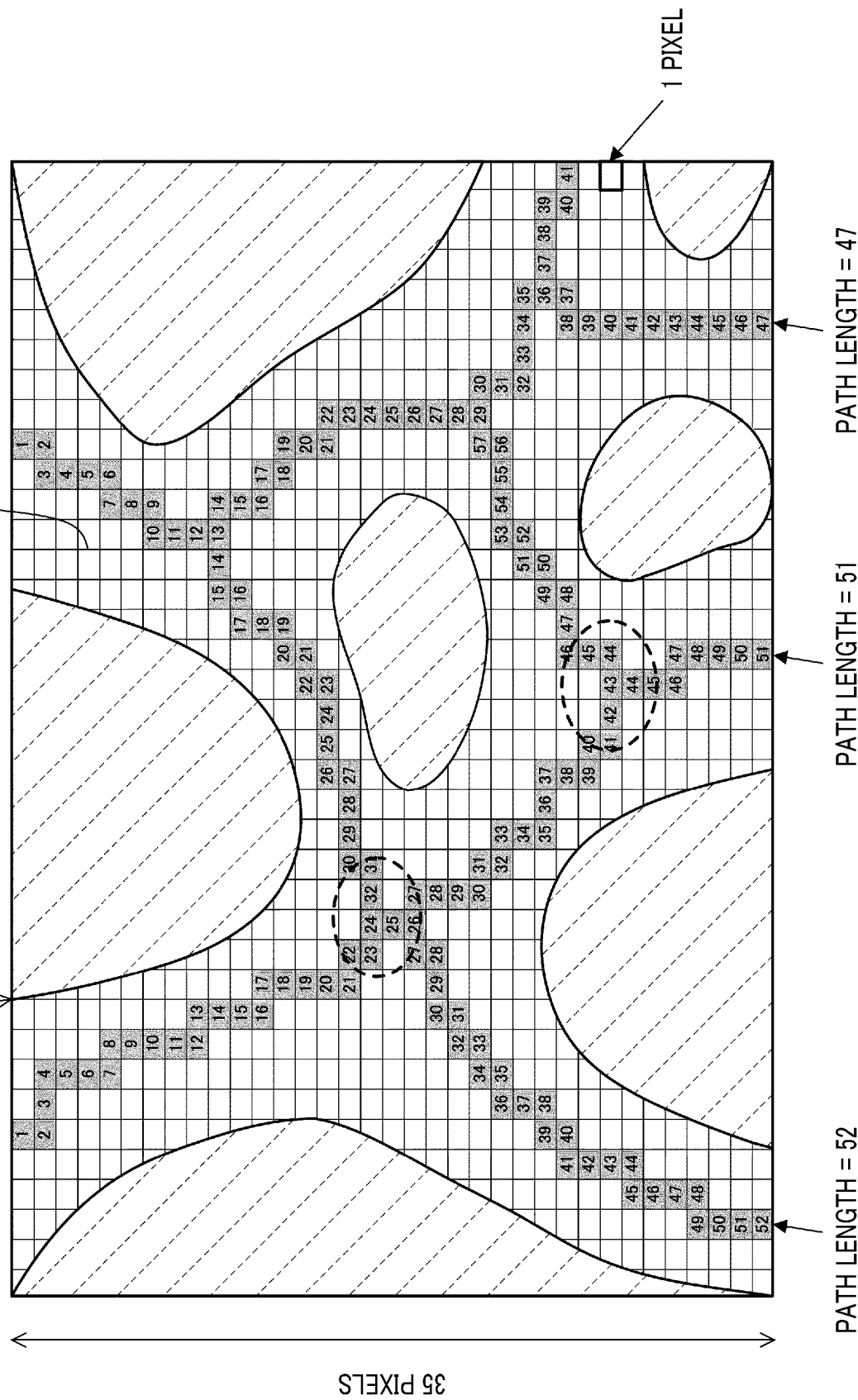

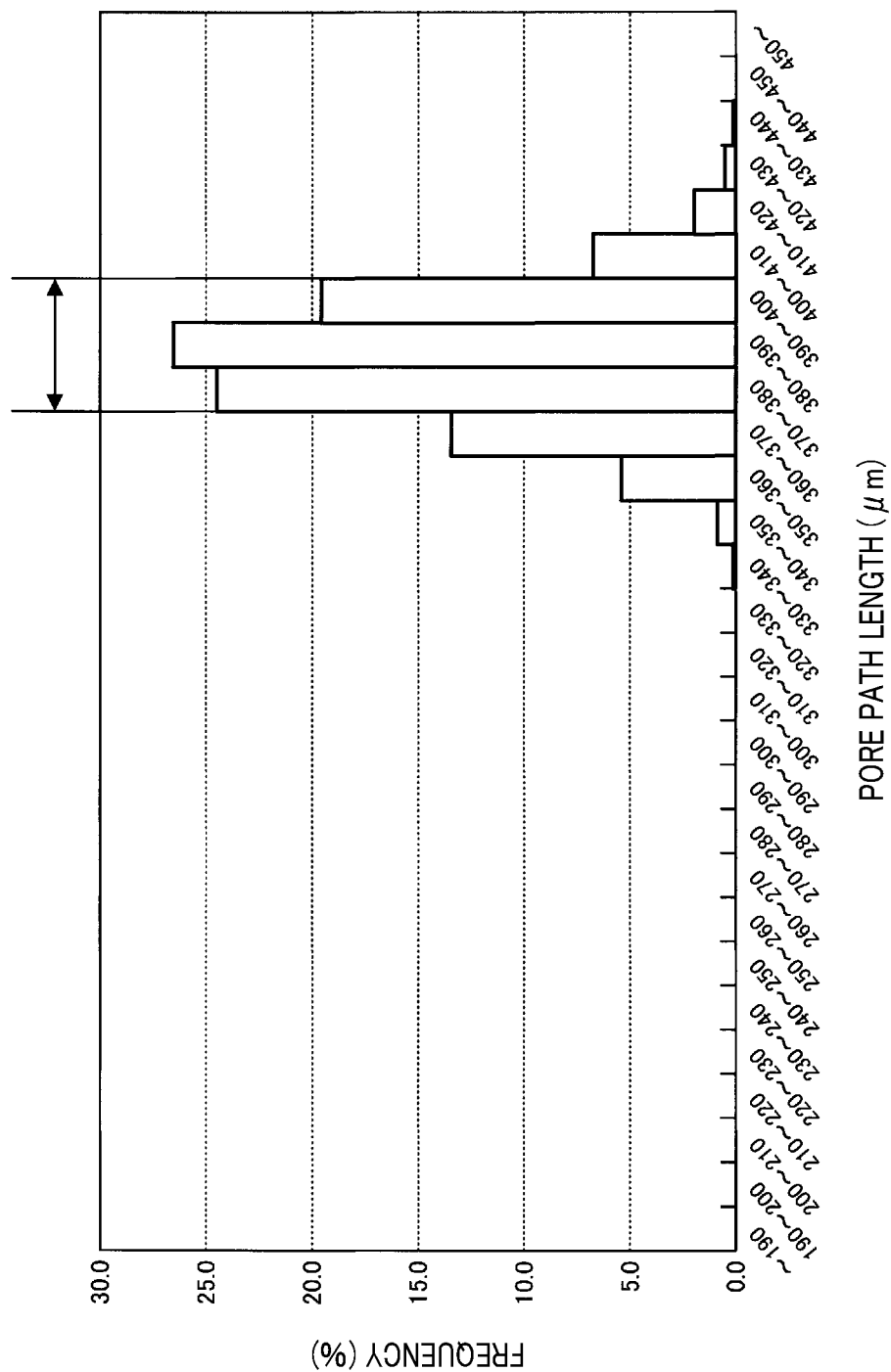

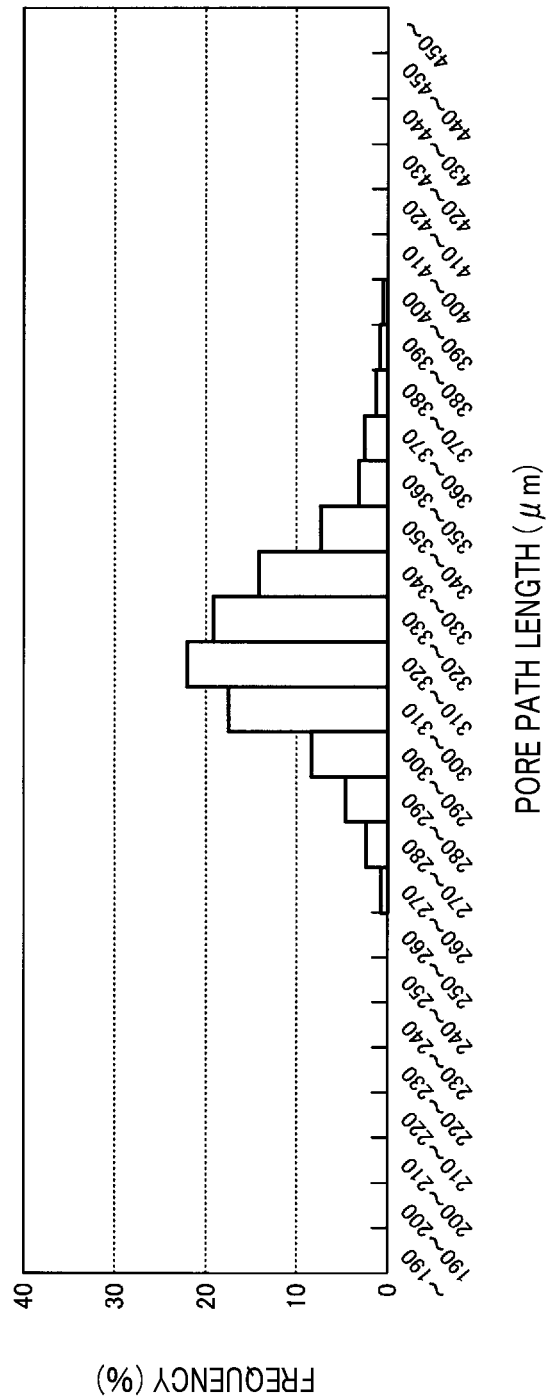

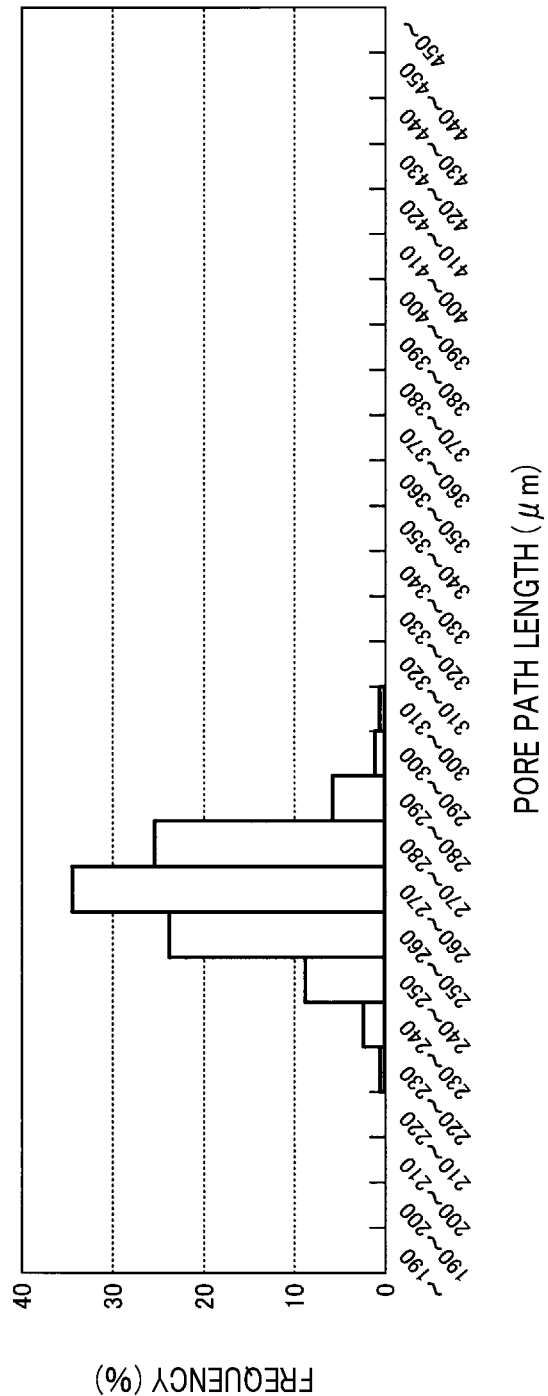

FIG.15  COMPARATIVE EXAMPLE 2

$y = -3.9431X^2 - 32.666x + 91.45$
$R^2 = 0.9632$

EXHAUST GAS PURIFICATION FILTER

This application is a U.S. application under 35 U.S.C. 111(a) and 363 that claims the benefit under 35 U.S.C. 120 from International Application No. PCT/JP2018/022605 filed on Jun. 13, 2018, the entire contents of which are incorporated herein by reference. The present application is also based on Japanese Patent Application No. 2017-115978, filed Jun. 13, 2017, the content of which is incorporated herein by reference.

BACKGROUND

Technical Field

The present disclosure relates to an exhaust gas purification filter.

Background Art

The exhaust gas discharged from internal combustion engines, such as diesel engines and gasoline engines, and heat engines, such as boilers, contains particulate matter referred to as particulates. Particulates are referred to as PM below as appropriate. Exhaust gas purification filters are used for collecting the PM within an exhaust gas.

The PM collected and accumulated in an exhaust gas purification filter is removed by combustion. In order to remove the PM by combustion at low temperatures, exhaust gas purification filters are loaded with, for example, a catalyst composed of a noble metal.

There has been known a ceramic honeycomb structure in which various parameters, such as the porosity, the median pore size as measured by mercury porosimetry, and the slope of the pore size distribution, have been adjusted.

SUMMARY

An aspect of the present disclosure is an exhaust gas purification filter comprising:
 a casing;
 a porous dividing wall; and
 cells enclosed by the dividing wall; wherein
 a pore path length distribution of the dividing wall has an integrated frequency of at least 58%.

BRIEF DESCRIPTION OF THE DRAWINGS

FIG. 7 is a diagram showing a thinning processing image of a pore path in a dividing wall according to the first embodiment.

FIG. 8 is a diagram showing a frequency histogram of a pore path length distribution according to first embodiment.

FIG. 9 is a diagram showing a frequency histogram of a pore path length distribution according to Example 1 of a second embodiment.

FIG. 10 is a diagram showing a frequency histogram of a pore path length distribution according to Example 2 of the second embodiment.

DETAILED DESCRIPTION OF THE PREFERRED EMBODIMENTS

Figure 1:
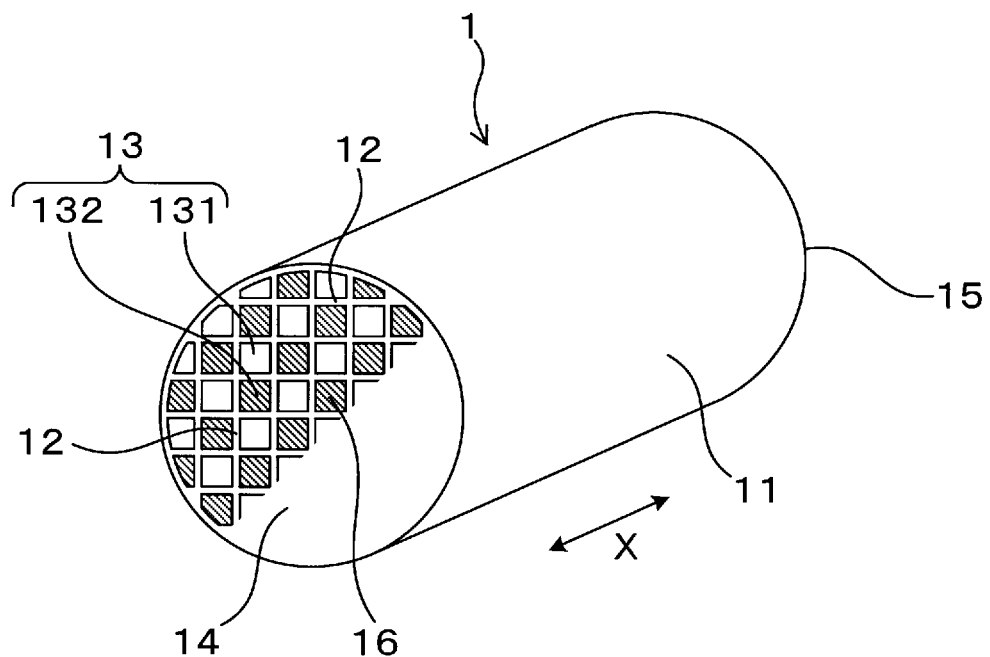
FIG. 1 is a perspective view of an exhaust gas purification filter according to a first embodiment.

Exhaust gas purification filters that increase the PM collection rate while also reducing a loss of pressure are sought. For this purpose, it is important to control the pore characteristics of the exhaust gas purification filter. The PM collection rate is referred to as collection rate below as appropriate, and the loss of pressure is referred to as pressure loss as appropriate.

Therefore, proposed in JP 5673665 B is a ceramic honeycomb structure in which various parameters, such as the porosity, the median pore size as measured by mercury porosimetry, and the slope of the pore size distribution, have been adjusted. In such a ceramic honeycomb structure, it is possible to reduce the pressure loss by increasing the gas permeability coefficient to some extent, while also increasing the collection rate.

However, adjusting the median pore size and pore size distribution as measured by a mercury porosimeter or the like in a conventional manner is insufficient for achieving both a low pressure loss and a high collection rate. Specifically, in the conventional ceramic honeycomb structure described above, the range of the gas permeability coefficient that can achieve both a low pressure loss and a high collection rate is approximately 0.55 to 0.59, and the trade-off relationship between the pressure loss and the collection rate cannot be sufficiently overcome.

This is thought to occur because the pores in the dividing wall include pores that affect the gas flow, and pores that do not affect the gas flow. Even if the open pores of the dividing wall are comprehensively adjusted in a conventional manner, there is a limit to the extent in which the characteristics can be improved. Therefore, it is important to control the pore characteristics by focusing on the pores that affect the gas flow.

Furthermore, if a catalyst is coated on the base material of the exhaust gas purification filter, the gas permeability coefficient usually decreases and the pressure loss increases. In consideration of the decrease in the gas permeability coefficient that arises due to the catalyst coating, it is desirable for the gas permeability coefficient of the base material before applying the catalyst coating to be increased to at least 0.8. That is to say, it is desirable to further increase the collection rate while also reducing the pressure loss by further increasing the gas permeability coefficient.

The present disclosure has been made in view of such a problem, and has an object of providing an exhaust gas purification filter that achieves both a low pressure loss and a high collection rate at a high level.

An aspect of the present disclosure is an exhaust gas purification filter comprising:

a casing;

a porous dividing wall which partitions the inside of the casing into a honeycomb shape; and cells enclosed by the dividing wall; wherein a pore path length distribution of the dividing wall, when expressed by a frequency histogram per 10 μm of the pore path length of the dividing wall, has an integrated frequency of at least 58%, the integrated frequency being a maximum value of a value obtained by summing the frequencies of a total of three adjacent levels which include the maximum peak frequency.

In the exhaust gas purification filter described above, the frequency histogram per 10 μm of the pore path length of the dividing wall has an integrated frequency of at least 58%. The integrated frequency is the maximum value of a value obtained by summing the frequencies of a total of three adjacent levels which include the maximum peak frequency. Specifically, for example, an integrated value obtained from a total of three peaks including the maximum peak in the frequency histogram and both adjacent peaks is at least 58%. Consequently, even if the gas permeability coefficient is sufficiently increased to lower the pressure loss, the collection rate can be sufficiently increased. Therefore, for example, the low pressure loss and high collection rate can be sufficiently maintained even when a catalyst is coated on the exhaust gas purification filter.

The reason for this is as follows. The pore path length is the shortest path of connecting pores, and is capable of substituting for the distance an exhaust gas flows inside the dividing wall. As the pore path length becomes longer, the pressure loss of the pore increases, which makes it more difficult for the exhaust gas to flow. This means that the pore is not effectively utilized. That is to say, the smaller the frequency of levels having a long pore path length in the pore path length distribution, the more the gas disperses and flows in the pores that have a short pore path length, and therefore, the collection rate decreases, the gas permeability coefficient increases, and the pressure loss decreases. On the other hand, the smaller the frequency of levels having a short pore path length, the more the gas disperses and flows in the pores that have a long pore path length, and therefore, the collection rate improves, the gas permeability coefficient decreases, and the pressure loss increases.

In the frequency histogram described above, the total of three adjacent peaks which include the maximum peak represent those pores having pore path lengths which are used for gas flow. Increasing the integrated frequency of these pores to at least 58% increases the pores in the dividing wall through which the exhaust gas actually flows. That is to say, the exhaust gas flow velocity decreases, the collection rate is sufficiently improved, and because the pores are effectively used, it is possible to improve the gas permeability coefficient and to sufficiently reduce the pressure loss.

As described above, according to the above aspect, it is possible to provide an exhaust gas purification filter that achieves both a low pressure loss and a high collection rate at a high level.

First Embodiment

An embodiment according to an exhaust gas purification filter will be described with reference to FIG. 1 to FIG. 8.

FIG. 1 is drawn showing part of the dividing wall and cells omitted for ease of illustration of the diagram, however, in reality the dividing wall and cells do exist. The dividing wall is also generally referred to as a cell wall.

Figure 2:
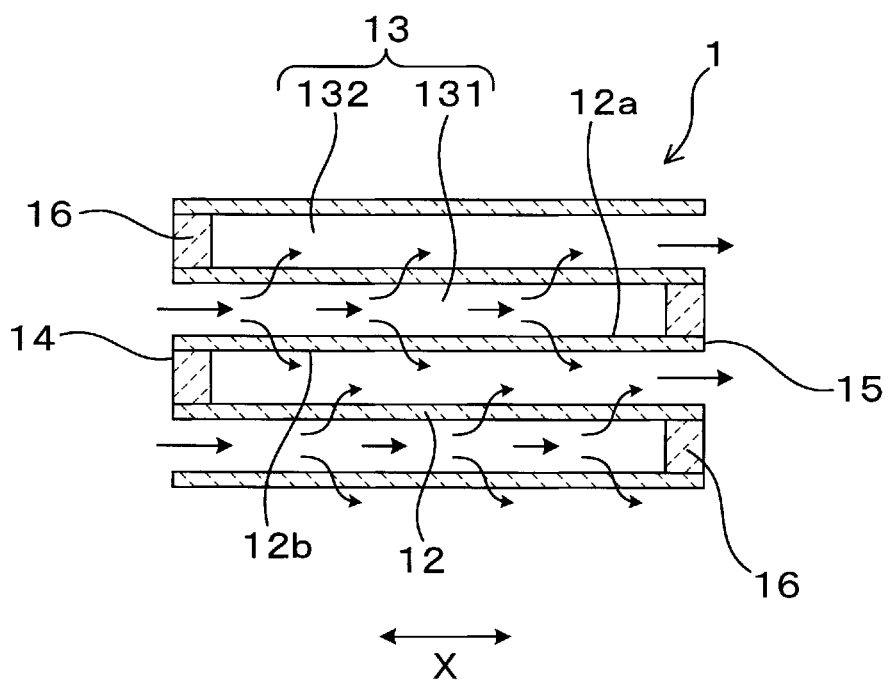
FIG. 2 is an enlarged partial sectional view in the axial direction of the exhaust gas purification filter according to the first embodiment.

As illustrated in FIG. 1 and FIG. 2, the exhaust gas purification filter 1 is, for example, made of cordierite, and comprises a casing 11, a dividing wall 12, and cells 13. The casing 11 has a cylindrical shape such as a circular cylindrical shape. The description below assumes that the axial direction X of the cylindrical casing is the axial direction X of the exhaust gas purification filter 1. Furthermore, the arrows in FIG. 2 indicate the flow of an exhaust gas when the exhaust gas purification filter 1 is placed in the flow path of the exhaust gas, such as in an exhaust gas piping.

Figure 3:
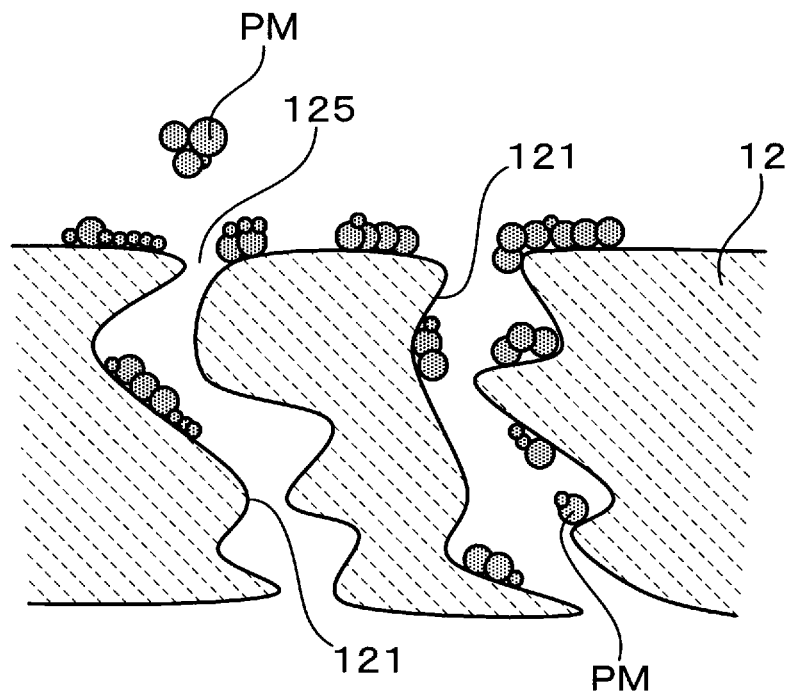
FIG. 3 is an enlarged sectional view of a dividing wall in the exhaust gas purification filter according to the first embodiment.

As illustrated in FIG. 1 and FIG. 2, the dividing wall 12 partitions the inside of the casing 11. For example, the dividing wall 12 is provided with a lattice shape. The exhaust gas purification filter 1 is a porous body, and multiple pores 121 are formed in the dividing wall 12 as illustrated in FIG. 3. Therefore, the PM included in the exhaust gas can be deposited and collected on the surface of the dividing wall 12 or inside the pores 121. The PM represents fine particles referred to as particulate matter, particulates, and the like.

The thickness of the dividing wall 12 can be adjusted in a range of, for example, 100 to 400 μm. The porosity of the exhaust gas purification filter 1 can be adjusted in a range of 45 to 75%. The average pore size can be adjusted in a range of 5 to 50 μm. The porosity and the average pore size can be measured by the mercury intrusion method described below.

As illustrated in FIG. 1 and FIG. 2, the exhaust gas purification filter 1 has multiple cells 13. The cells 13 are enclosed by the dividing wall 12, resulting in the formation of gas flow paths. The extension direction of the cells 13 normally coincides with the axial direction X.

As illustrated in FIG. 1, for example, the cell shape is a square shape in a filter section in the direction orthogonal to the axial direction X, but it is not limited to this. The cell shape may also be a polygonal shape such as a triangular shape, a square shape, or a hexagonal shape, or may be circular. Furthermore, two or more different types of shapes may be combined.

The exhaust gas purification filter 1 is, for example, a columnar body having a cylindrical shape or the like, and the dimensions can be appropriately changed. The exhaust gas purification filter 1 has, on both ends in the axial direction X, a first end surface 14 and a second end surface 15. When the exhaust gas purification filter 1 is placed inside an exhaust gas flow path, such as in an exhaust gas piping, the first end surface 14 becomes, for example, the upstream side end surface, and the second end surface 15 becomes, for example, the downstream side end surface.

The cells 13 are capable of having first cells 131 and second cells 132. As illustrated in FIG. 2, the first cells 131 are open with respect to the first end surface 14, and are closed by a plug 16 at the second surface 15. The second cells 132 are open with respect to the second end surface 15, and are closed by a plug 16 at the first surface 14. The plug 16 may, for example, be formed of a ceramic such as cordierite, but may also be formed from another material.

The first cells 131 and the second cells 132 are, for example, formed side by side such that they are adjacent to each other in the horizontal direction, which is perpendicular to the axial direction X, and in the vertical direction, which is perpendicular to both the axial direction X and the horizontal direction. That is to say, when the first end surface 14 or the second end surface 15 of the exhaust gas purification filter 1 is viewed from the axial direction X, the first cells 131 and the second cells 132 are, for example, arranged in a checkered pattern.

Figure 4:
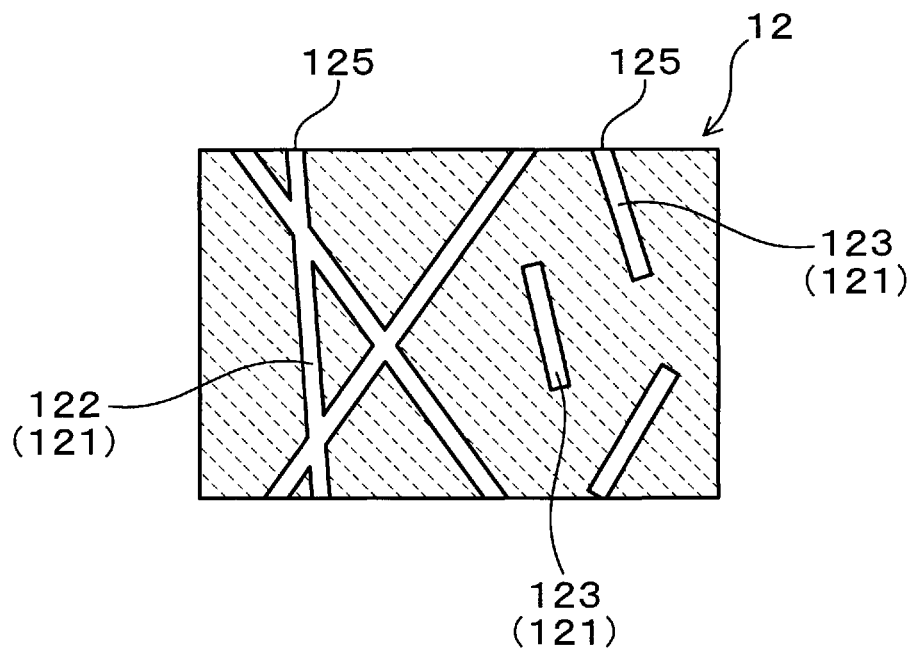
FIG. 4 is a schematic sectional view of a dividing wall having connecting pores and non-connecting pores according to the first embodiment.

Multiple pores 121 are formed inside the dividing wall 12 as illustrated in FIG. 3. As illustrated in FIG. 2, the dividing wall 12 separates two adjacent cells 131 and 132, and the pores 121 inside the dividing wall 12 include, as illustrated in FIG. 4, connecting pores 122 that provide a connection between adjacent cells 131 and 132, and non-connecting pores 123 that do not provide a connection. FIG. 3 and FIG. 4 are illustrated in a simplified, two-dimensional fashion, and most of the connecting pores 122 are considered to be intersecting in three dimensions. FIG. 4 illustrates the pores 121 of the dividing wall 12 in FIG. 3 in a more simplified fashion. The same applies to FIG. 5 described below.

Among the pores 121, the pores through which the exhaust gas actually flows are important in terms of influencing the pressure loss and the collection rate, and the flow velocity is considered to be important. If the magnitude of the gas flow velocity that flows from the surface openings 125 into the pores 121 is known, it is considered to be possible to identify the pores that contribute to pressure loss and collection rate performance, and the pores that do not contribute. Therefore, by improving the pore distribution, it is considered to be possible to realize a reduction in the pressure loss and an improvement in the collection rate. Specifically, the following may be considered.

The gas flow velocity flowing through the pores 121 is dependent on the connecting pores 122. If the pore path length is long, as shown for the connecting pore 122a illustrated in FIG. 5A, the pressure loss becomes high in the pore 122a, and therefore, it becomes difficult for the gas to flow. That is to say, the gas flow velocity decreases as a result of a reduction in the gas flow rate. Therefore, the connecting pore 122a is not effectively used.

Figure 5A:
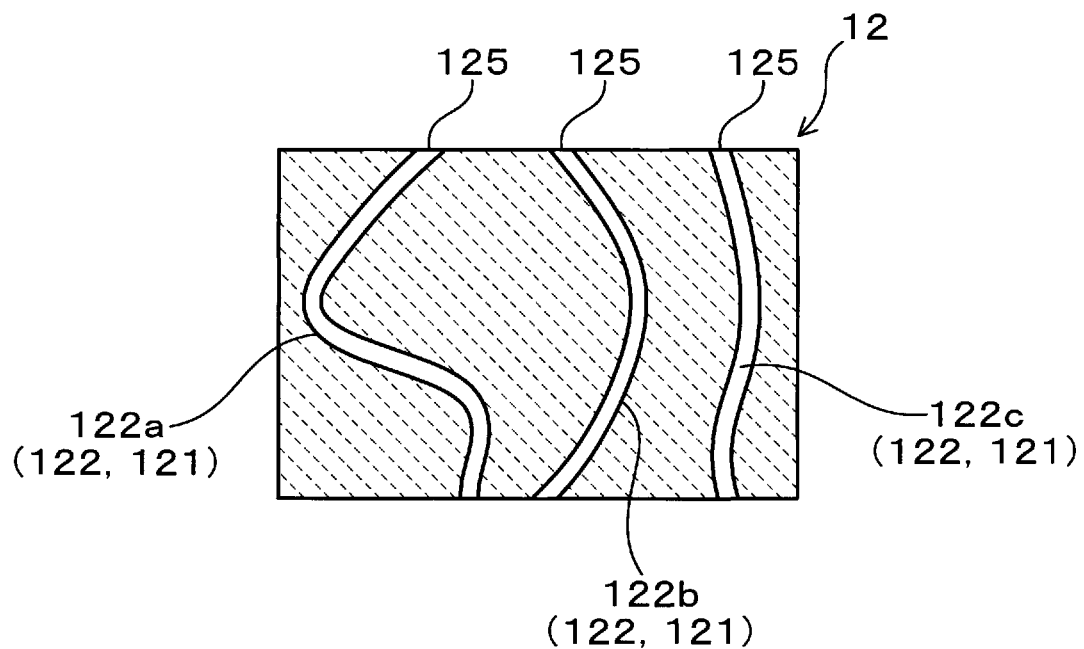
FIG. 5A is a schematic sectional view of a dividing wall having connecting pores with a non-uniform pore path length.

On the other hand, if the pore path length is relatively short, as shown for the connecting pores 122b and 122c illustrated in FIG. 5A, the pressure loss becomes low in the pores 122b and 122c, and therefore, the gas flow concentrates in the pores 122b and 122c. That is to say, the gas flow velocity increases as a result of an increase in the gas flow rate relative to the other pore 122a. The collection rate decreases when the gas flow velocity increases.

Generally, the flow velocity V, the flow rate Q, and the pore cross-sectional area A satisfy the relationship V=Q/A. In a dividing wall 12 having the pore paths illustrated in FIG. 5A, because the connecting pore 122a is not effectively used, the flow velocity V becomes Q/2 when the pore cross-sectional area is assumed to be 1.

Figure 5B:
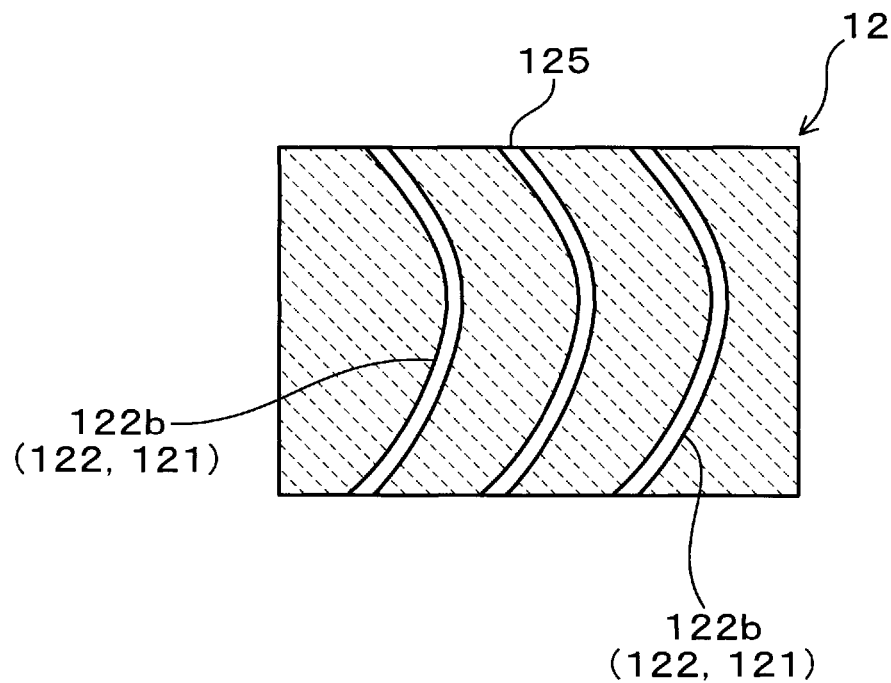
FIG. 5B is a schematic sectional view of a dividing wall having connecting pores with a uniform pore path length according to the first embodiment.

On the other hand, in a dividing wall 12 having the pore paths illustrated in FIG. 5B, because all of the connecting pores 122b are effectively used, the flow velocity V becomes Q/3. That is to say, the dividing wall 12 having the pore paths illustrated in FIG. 5B has a slower flow velocity compared to the dividing wall 12 illustrated in FIG. 5A.

In other words, when the frequency distribution of pore path lengths becomes broad, the flow velocity increases. On the other hand, when the frequency distribution of pore path lengths becomes sharp, the flow velocity decreases. That is to say, the performance improves as the path length distribution becomes sharp.

When measuring the pore path length distribution, the pore path length for the pores 121 is calculated one by one, and in those cases where a pore 121 intersects, it becomes important to calculate the frequency distribution of pore path lengths by selecting the shorter path length, which decreases the pressure loss. However, for example, in a pore size distribution measurement using a mercury porosimeter, it is not possible to measure the pore path length or select the path length when the pores 12 intersect. As a result, a pore size distribution obtained by a mercury porosimeter has an unclear magnitude relationship with respect to the gas flow velocity, and therefore, the frequency distribution described above cannot be analyzed.

Therefore, thinning processing of the pores 121 in the dividing wall 12 may be performed by using image data which is three-dimensionally analyzed by means of a CT scan. Then, by using image analysis software, the target data can be calculated by performing processing that selects the shorter path length for those pores 121 that intersect inside the dividing wall 12. The measurement method is presented below.

Figure 6A:
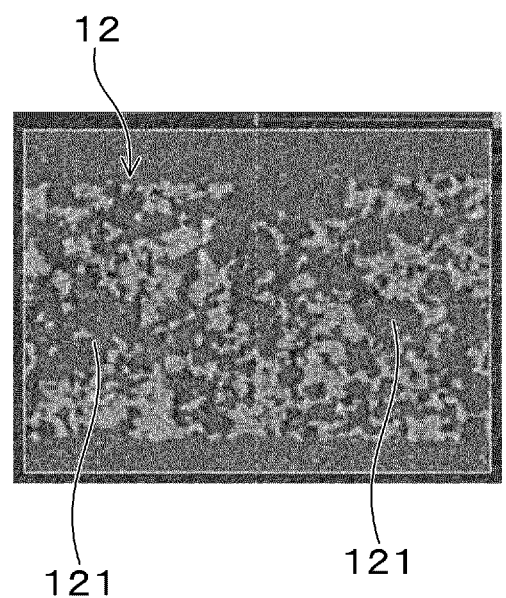
FIG. 6A is a diagram showing a CT scan of a dividing wall of the exhaust gas purification filter.

First, as illustrated in FIG. 6A, a CT scan image of the dividing wall 12 of the exhaust gas purification filter is measured. An Xradia 520 Versa manufactured by Zeiss is used as the CT scan device. The measurement conditions are a tube voltage of 80 kV and a tube current of 87 μmA. The resolution of the captured image is 1.6 μm/pixel.

As illustrated in FIG. 6A, the captured image is cropped to an arbitrary size. The size of an analysis image in the following example is 500 μm×500 μm× thickness of the dividing wall 12.

Figure 6B:
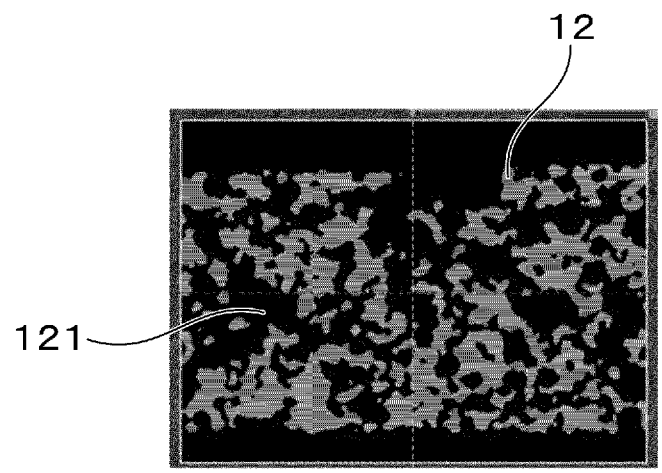
FIG. 6B is a diagram showing a binarized image of the CT scan image according to the first embodiment.
Figure 11:
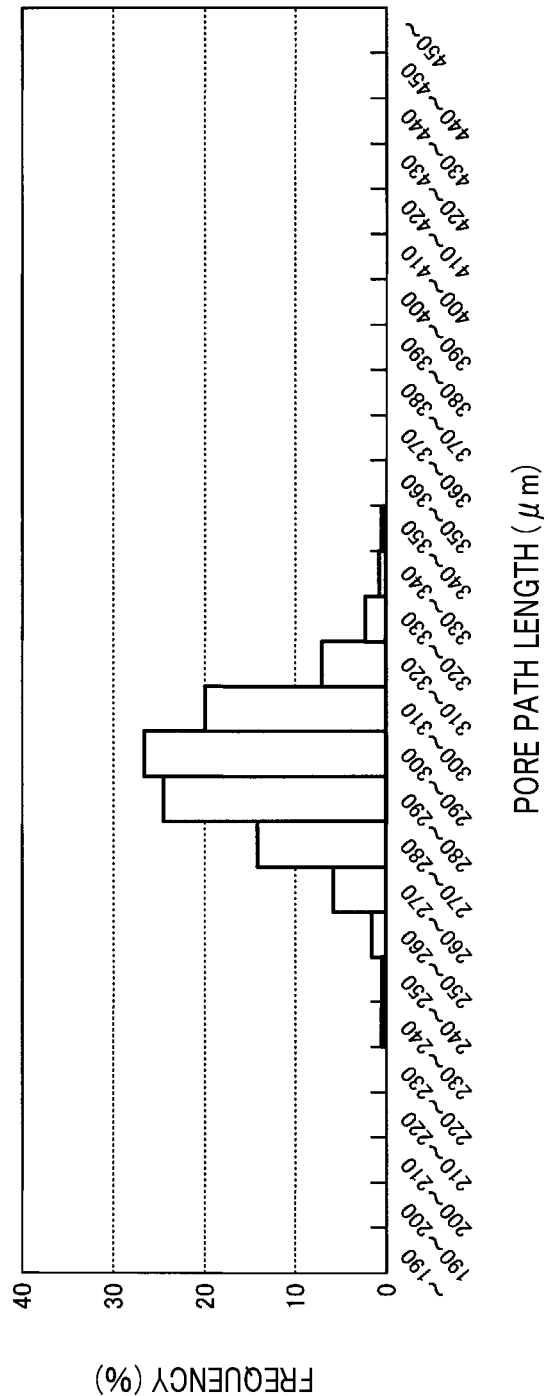
FIG. 11 is a diagram showing a frequency histogram of a pore path length distribution according to Example 3 of the second embodiment.
Figure 12:
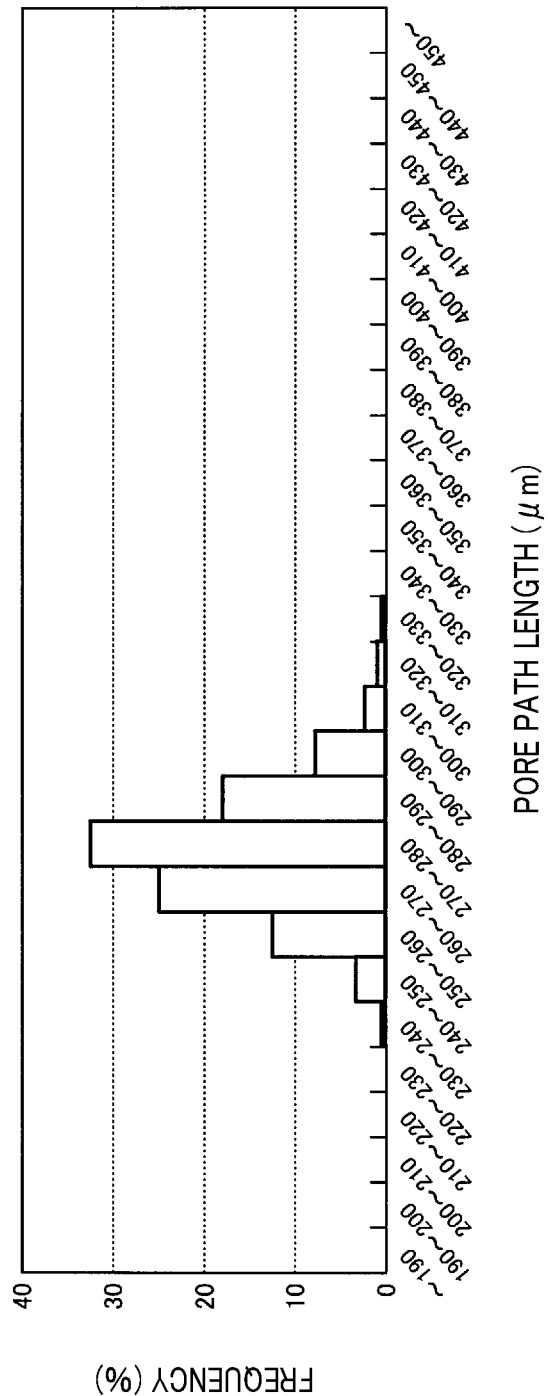
FIG. 12 is a diagram showing a frequency histogram of a pore path length distribution according to Example 4 of the second embodiment.
Figure 13:
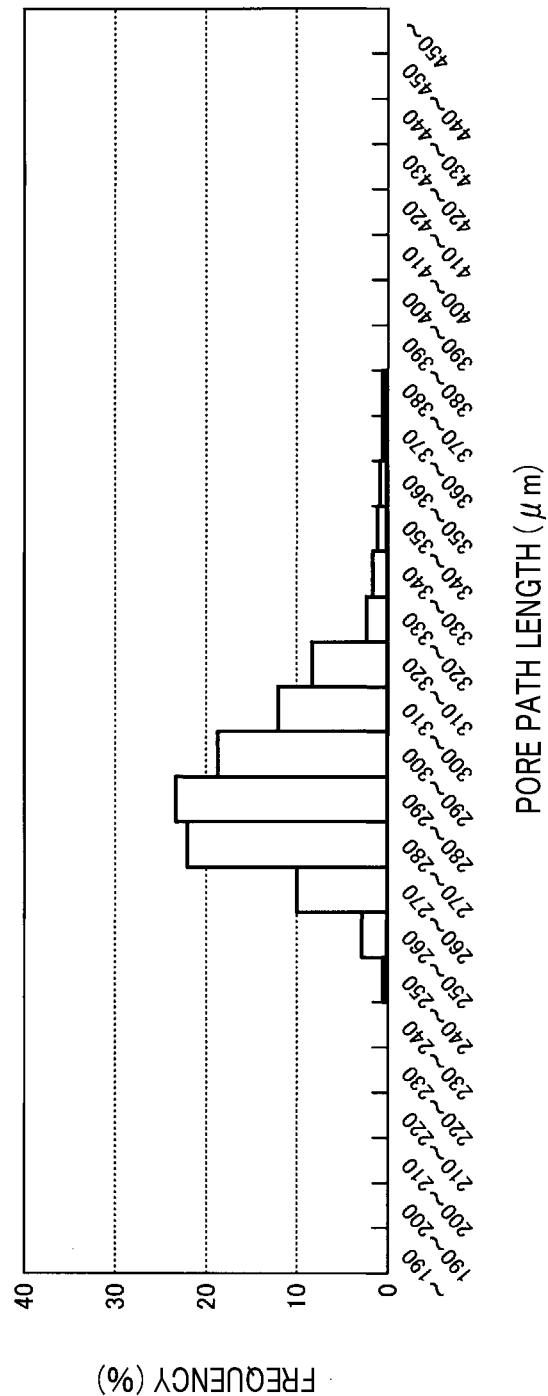
FIG. 13 is a diagram showing a frequency histogram of a pore path length distribution according to Example 5 of the second embodiment.
Figure 14:
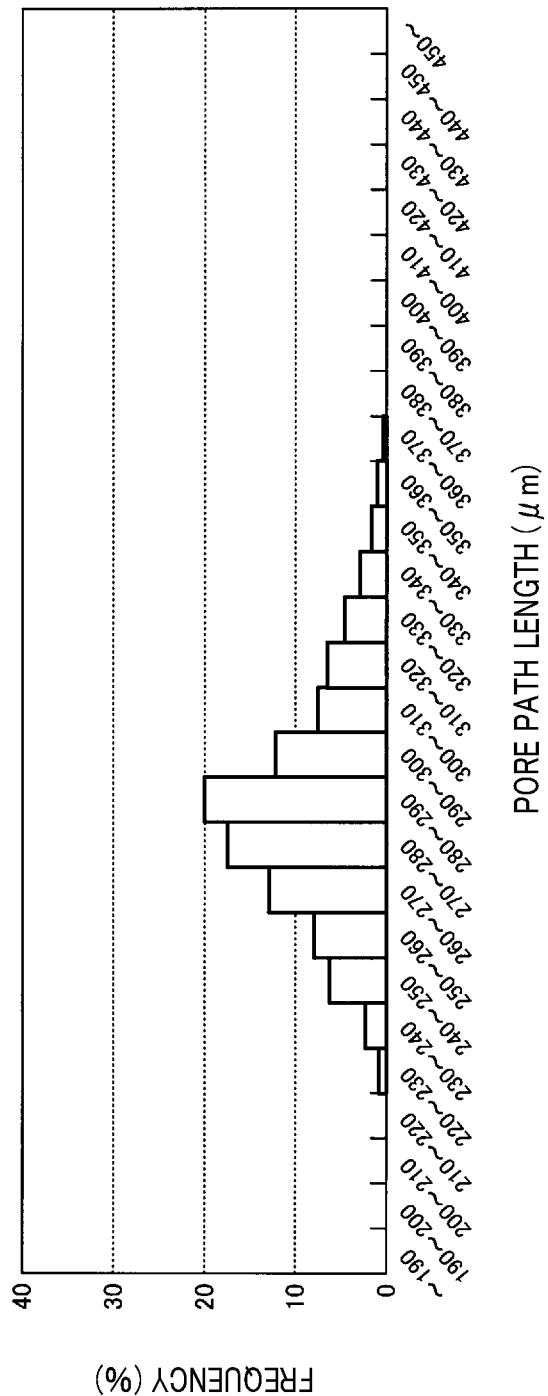
FIG. 14 is a diagram showing a frequency histogram of a pore path length distribution according to Comparative Example 1 of the second embodiment.
Figure 15:
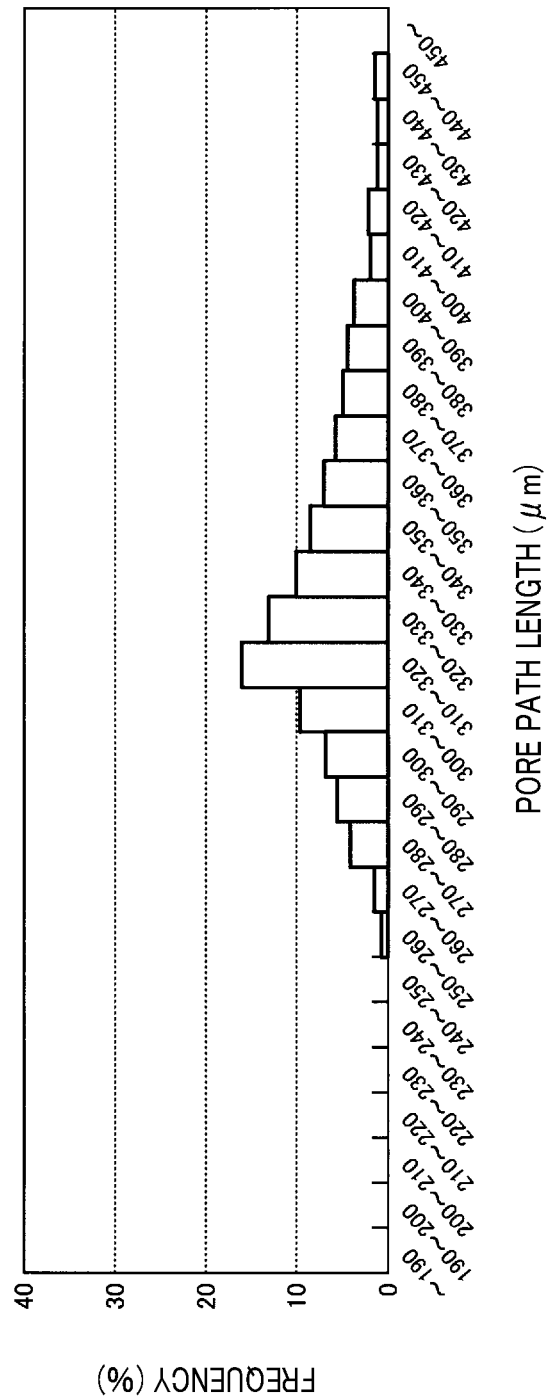
FIG. 15 is a diagram showing a frequency histogram of a pore path length distribution according to Comparative Example 2 of the second embodiment.

Next, binarization processing is performed. The image analysis software ImageJ version 1.46 is used to perform binarization processing. The binarization has an object of classifying the pore sections and the ceramic sections in the dividing wall. In the binarization processing, because there is a difference in brightness between the pore sections and the ceramic sections, binarization processing is performed after performing removal of the noise remaining in the captured image and setting an arbitrary threshold. Because the threshold differs between samples, a threshold that enables the pore sections and the ceramic sections is set for each captured image while visually inspecting the entire image captured by the CT scan. The captured image after binarization processing is shown in FIG. 6B. In FIG. 6B, the black regions represent pores, and the gray regions represent the ceramic.

Next, the path lengths of the pores 121 are measured based on the captured image after binarization processing. The pore path length measurement uses IGORL version 6.0.3.1 manufactured by Hulinks Inc. First, thinning processing is carried out with respect to the pores 121 in the captured image. An example of a result of the thinning processing is shown in FIG. 7. As illustrated in FIG. 7, the thinning processing represents the process of connecting the pixel centers of the pores 121 with lines.

Based on the image after thinning processing illustrated in FIG. 7, for a dividing wall 12 separating adjacent cells, the path length is calculated by taking the number of pixels required to traverse from a dividing wall surface 12a facing one of the cells 131 to dividing wall surface 12b facing the other cell 131 (refer to FIG. 2). In a case where intersecting areas exist in the pore path such as the regions enclosed by broken lines in FIG. 7, the shorter path length is selected. That is to say, the processing is performed under the assumption that the number of pores 121 which are open on the dividing wall surface 12b and the number of paths are the same. In a three-dimensional analysis, the total path length for each pore 121 to reach the dividing wall surface 12b from the dividing wall surface 12a is calculated.

The illustration in FIG. 7 has three pore path lengths, and the respective path lengths expressed in numbers of pixels is, from the left, 52, 51, and 47. The actual pore path length, based on the resolution of the captured image of 1.6 μm/pixel, is calculated by multiplying the path lengths in numbers of pixels by 1.6. FIG. 7 represents an example of a thinning processing image, which differs from the thickness of an actual dividing wall.

As a result of measuring the pore path lengths of the dividing wall 12 as described above, a pore path length distribution, that is to say, a frequency histogram, is obtained. The pore path length distribution is obtained by calculating a frequency (%) for all of the calculated pore path lengths in a histogram. The frequency histogram is represented by a bar graph of the data after dividing the pore path lengths into 10 μm levels.

The reason for dividing the pore path lengths of the dividing wall 12 into 10 μm levels as described above is because divisions corresponding to the pore size, which represents the smallest unit of the pore path length, are preferable. Further, although pores having various pore sizes, for example, from 1 to 100 μm, exist inside the dividing wall 12, a large proportion of these pores have a pore size from 10 to 20 μm. This is considered to be because the pore size is derived from the particle size of a silica raw material, which serves as a pore forming material. Therefore, by dividing the histogram interval every 10 μm, the pore path lengths are considered to be accurately separated.

For example, when the thickness of the dividing wall 12 is 200 μm, the pore path length starts from 200 μm. Next, the total number of path lengths of at least 200 μm but less than 210 μm are counted. Subsequently, the total number of path lengths is counted every 10 μm. Then, the frequency of each path length is calculated by dividing each count number by the total number, and then expressing the obtained value as a percentage.

FIG. 8 shows an example of a frequency histogram showing the pore path length distribution of a dividing wall 12. The integrated frequency, which is the maximum value of a value obtained by summing the frequencies of a total of three adjacent levels which include the maximum peak frequency, is calculated based on the frequency histogram. As shown in FIG. 8, when there is one maximum peak frequency, an integrated frequency is calculated by summing the maximum peak frequency of the pore path lengths and the frequencies of the two levels adjacent to the maximum peak frequency. Specifically, for example, the total value of the three frequencies indicated by the arrows illustrated in FIG. 8 is calculated. Although not shown, when there are two or more maximum peak frequencies in the frequency histogram, the total value may be selected such that the sum of the frequencies of three adjacent levels which includes the maximum peak frequency is maximized. In this case, although the integrated frequency may include a plurality of maximum peak frequencies, it remains a total value of three levels.

In the exhaust gas purification filter according to the present embodiment, the integrated frequency described above is increased to at least a predetermined value in the frequency histogram per 10 μm of the pore path length of the dividing wall 12. Consequently, for example, even if the gas permeability coefficient is increased to at least $0.8 \times 10^{-12}$ m$^2$ to sufficiently lower the pressure loss, the PM collection rate can be sufficiently increased. Therefore, for example, low pressure loss and high collection rate can be sufficiently maintained even when a catalyst is coated on the exhaust gas purification filter 1. The reason for this is considered to be as follows.

As illustrated in FIG. 7, the pore path length is the shortest path of connecting pores, and is capable of substituting for the distance of an exhaust gas flows inside the dividing wall 12. Further, as the pore path length becomes longer, the pressure loss of the pores increases, which makes it more difficult for the exhaust gas to flow. That is to say, the pores 121 having long path lengths are not effectively utilized.

Furthermore, as the frequencies in the pore path length distribution decrease, the gas flow concentrates in the pores 121 having short pore path lengths. Therefore, the PM collection rate decreases in the exhaust gas purification filter 1, the gas permeability coefficient decreases, and the pressure loss increases.

In the frequency histogram illustrated in FIG. 8, the maximum peak and the two adjacent peaks are pores 121 having pore path lengths which are used for gas flow. Increasing the integrated frequency of these pores 121 increases the pores 121 in the dividing wall 12 through which the exhaust gas actually flows. That is to say, the exhaust gas flow velocity decreases, the collection rate is sufficiently improved, and because the pores 121 are effectively used, it is possible to improve the gas permeability coefficient and to sufficiently reduce the pressure loss as described above.

As shown in the second embodiment described below, it is preferable for the integrated frequency to be at least 58%. As a result, the exhaust gas purification filter 1 is capable of achieving a low pressure loss and a high collection rate at a high level. From the perspective of achieving an even higher level, it is preferable for the integrated frequency to be at least 70%.

Next, a production method of the exhaust gas purification filter 1 will be described. The exhaust gas purification filter 1 is, for example, mainly composed of cordierite having a chemical composition of $SiO_2$: 45 to 55 wt. %; $Al_2O_3$: 33 to 42 wt. %; and MgO: 12 to 18 wt. %. Therefore, when producing the exhaust gas purification filter 1, a cordierite raw material including an Si source, an Al source, and an Mg source is used such that a cordierite composition is formed.

The cordierite raw material is a raw material which is capable of forming a cordierite composition upon sintering. A mixture in which silica, talc, aluminum hydroxide, alumina, kaolin, and the like are appropriately mixed is used as the cordierite raw material. It is preferable to use porous silica as the silica. Furthermore, from the perspective of the ability to increase the porosity, it is preferable to use aluminum hydroxide as the Al source.

In the production of the exhaust gas purification filter 1, water, binders, lubricating oil, pore forming materials, and the like are appropriately mixed with the cordierite raw material to produce a clay containing the cordierite raw material. A kneader may be used to perform the mixing. Then, for example, the clay is molded into a honeycomb shape by extrusion molding. The molded article consists of the clay and is cut, for example, to a prescribed length after drying.

Next, the molded article is sintered. As a result, a sintered body having a honeycomb structure is obtained. Although not shown, the honeycomb structured sintered body has a configuration equivalent to the exhaust gas purification filter illustrated in FIG. 1 and FIG. 2, except in the aspect that a plug has not been formed.

Next, a plug 16 is formed. The plug 16 is formed by filling, by means of a dispenser or printing or the like, the first end surface 14 or the second end surface 15 of the cells 13 using a slurry which includes the same type of ceramic raw material as the sintered body, and then performing sintering. The method of forming the plug 16 is not particularly limited, and another method may also be used. Furthermore, a plug may be formed in the molded article prior to sintering, and the sintering of the molded article and the plug may be simultaneously progressed by means of a single sintering process.

The exhaust gas purification filter can be produced as described above. The integrated frequency of the pore path length distribution in the exhaust gas purification filter 1 is adjusted to at least a prescribed value as described above. As a result, it is possible to provide an exhaust gas purification filter 1 that achieves both a low pressure loss and a high collection rate at a high level.

Second Embodiment

In the present embodiment, a plurality of porous filters having different pore path length distributions is produced, and their performance is comparatively evaluated. Of the reference signs used in the second and subsequent embodiments, the same reference signs as those used in previous embodiments represent, unless otherwise indicated, the same components as those in previous embodiments.

In the present embodiment, seven types of exhaust gas purification filters 1 having different pore path length distributions are produced. These exhaust gas purification filters 1 are respectively referred to as Examples 1 to 5, Comparative Example 1, and Comparative Example 2. Except for having different pore path length distributions, these have the same configurations as each other, and are provided with the same configuration as the exhaust gas purification filter 1 of the first embodiment. First, the production method of the exhaust gas purification filters will be described.

The exhaust gas purification filters 1 of Examples 1 to 5 were produced by preparing cordierite raw materials by appropriately mixing porous silica, talc, and aluminum hydroxide as shown in Table 1. As shown in Table 1, the aluminum hydroxide used had either an average particle size of 5 μm, or a combination of average particle sizes of 3 μm and 8 μm.

On the other hand, the exhaust gas purification filters of Comparative Example 1 and Comparative Example 2 were produced by using fused silica instead of porous silica, and aluminum hydroxide having an average particle size of 8 μm as shown in Table 2. In the present specification, "average particle size" refers to the particle size at a volume integrated value of 50% in a particle size distribution obtained by the laser diffraction/scattering method.

As shown in Table 1 and Table 2, a pore forming material composed of graphite, water, lubricating oil, and a binder composed of methyl cellulose were added as appropriate to the cordierite raw material. A clay was produced from these mixed raw materials, molding of the clay was performed in the same manner as the first embodiment, and the exhaust gas purification filters were obtained following sintering and the formation of a plug.

TABLE 1

|  | Example 1 | | Example 2 | | Example 3 | | Example 4 | | Example 5 | |
| --- | --- | --- | --- | --- | --- | --- | --- | --- | --- | --- |
|  | Average particle size (μm) | Mixing ratio (wt. %) | Average particle size (μm) | Mixing ratio (wt. %) | Average particle size (μm) | Mixing ratio (wt. %) | Average particle size (μm) | Mixing ratio (wt. %) | Average particle size (μm) | Mixing ratio (wt. %) |
| Porous silica | 21 | 20.5 | 16 | 20.5 | 21 | 20.5 | 16 | 20.5 | 21 | 20.5 |
| Talc | 35 | 35.3 | 14 | 35.3 | 20 | 35.3 | 20 | 35.3 | 35 | 35.3 |
| Aluminum hydroxide | 5 | 44.2 | 3 | 13.3 | 3 | 13.3 | 3 | 22.1 | 5 | 44.2 |
|  | — | 0 | 8 | 30.9 | 8 | 30.9 | 8 | 22.1 | — | 0 |
| Methyl cellulose | — | 9 | — | 9 | — | 9 | — | 9 | — | 9 |
| Graphite | 25 | 20 | — | 0 | — | 0 | — | 0 | — | 0 |
| Lubricating oil | — | 5.5 | — | 5.5 | — | 5.5 | — | 5.5 | — | 5.5 |
| Water | — | 46 | — | 34 | — | 34 | — | 66 | — | 45 |

TABLE 2

|  | Comparative Example 1 | | Comparative Example 2 | |
| --- | --- | --- | --- | --- |
|  | Average particle size (μm) | Mixing ratio (wt. %) | Average particle size (μm) | Mixing ratio (wt. %) |
| Fused silica | 30 | 19.4 | 45 | 19.4 |
| Talc | 35 | 35.4 | 40 | 35.4 |
| Aluminum hydroxide | 8 | 45.2 | 8 | 45.2 |

TABLE 2-continued

|  | Comparative Example 1 | | Comparative Example 2 | |
| --- | --- | --- | --- | --- |
|  | Average particle size (μm) | Mixing ratio (wt. %) | Average particle size (μm) | Mixing ratio (wt. %) |
| Methyl cellulose | — | 9 | — | 9 |
| Graphite | 25 | 20 | 25 | 20 |
| Lubricating oil | — | 5.5 | — | 5.5 |
| Water | — | 34 | — | 34 |

In the same manner as the first embodiment, a frequency histogram of pore path lengths was measured with respect to each of the exhaust gas purification filters 1. The results are respectively shown in Table 3 and FIG. 9 to FIG. 15.

TABLE 3

| | Frequency (%) | | | | | | |
| --- | --- | --- | --- | --- | --- | --- | --- |
| Path length (μm) | Comparative Example 1 | Comparative Example 2 | Example 1 | Example 2 | Example 3 | Example 4 | Example 5 |
| 190 | 0.0 | 0.0 | 0.0 | 0.0 | 0.0 | 0.0 | 0.0 |
| 200 | 0.0 | 0.0 | 0.0 | 0.0 | 0.0 | 0.0 | 0.0 |
| 210 | 0.0 | 0.0 | 0.0 | 0.0 | 0.0 | 0.0 | 0.0 |
| 220 | 0.0 | 0.0 | 0.0 | 0.0 | 0.0 | 0.0 | 0.0 |
| 230 | 0.4 | 0.0 | 0.0 | 0.3 | 0.0 | 0.0 | 0.0 |
| 240 | 2.1 | 0.0 | 0.0 | 2.1 | 0.1 | 0.3 | 0.0 |
| 250 | 5.8 | 0.0 | 0.0 | 8.4 | 0.2 | 3.0 | 0.1 |
| 260 | 7.7 | 0.1 | 0.0 | 23.6 | 0.9 | 12.0 | 2.5 |
| 270 | 12.6 | 1.0 | 0.3 | 34.3 | 5.4 | 24.8 | 9.5 |
| 280 | 17.4 | 3.6 | 2.0 | 25.1 | 13.5 | 32.1 | 21.9 |
| 290 | 19.6 | 5.1 | 4.3 | 5.5 | 24.4 | 17.7 | 22.9 |
| 300 | 12.0 | 6.4 | 8.2 | 0.7 | 26.5 | 7.3 | 18.3 |
| 310 | 7.2 | 9.2 | 17.3 | 0.0 | 19.7 | 2.2 | 12.0 |
| 320 | 6.1 | 15.7 | 21.7 | 0.0 | 6.8 | 0.5 | 7.9 |
| 330 | 4.3 | 12.6 | 19.0 | 0.0 | 1.9 | 0.1 | 2.3 |
| 340 | 2.5 | 9.7 | 14.1 | 0.0 | 0.5 | 0.0 | 1.3 |
| 350 | 1.4 | 8.0 | 6.9 | 0.0 | 0.2 | 0.0 | 0.8 |
| 360 | 0.6 | 6.5 | 2.8 | 0.0 | 0.0 | 0.0 | 0.4 |
| 370 | 0.3 | 5.2 | 2.2 | 0.0 | 0.0 | 0.0 | 0.1 |
| 380 | 0.0 | 4.4 | 0.8 | 0.0 | 0.0 | 0.0 | 0.1 |
| 390 | 0.0 | 3.9 | 0.4 | 0.0 | 0.0 | 0.0 | 0.0 |
| 400 | 0.0 | 3.2 | 0.0 | 0.0 | 0.0 | 0.0 | 0.0 |
| 410 | 0.0 | 1.4 | 0.0 | 0.0 | 0.0 | 0.0 | 0.0 |
| 420 | 0.0 | 1.7 | 0.0 | 0.0 | 0.0 | 0.0 | 0.0 |
| 430 | 0.0 | 0.8 | 0.0 | 0.0 | 0.0 | 0.0 | 0.0 |
| 440 | 0.0 | 0.7 | 0.0 | 0.0 | 0.0 | 0.0 | 0.0 |
| 450 | 0.0 | 0.8 | 0.0 | 0.0 | 0.0 | 0.0 | 0.0 |

For each of the frequency histograms, an integrated frequency was calculated in the same manner as the first embodiment by summing the maximum peak frequency of the pore path lengths and the frequencies of the two levels adjacent to the maximum peak frequency. That is to say, the maximum value of values obtained by summing the frequencies of a total of three adjacent levels in the frequency histogram was calculated. The results are shown in Table 4. Furthermore, for each of the exhaust gas purification filters, the PM collection rate, the gas permeability coefficient, the average pore size (μm), and the porosity (%) were measured as follows. The results are shown in Table 4.

<PM Collection Rate>

The exhaust gas purification filter 1 was attached inside the exhaust pipe of a gasoline direct injection engine, and a PM-containing exhaust gas was flowed through the exhaust gas purification filter 1. At this time, the PM collection rate was calculated by measuring the PM count in the exhaust gas before flowing into the exhaust gas purification filter, and the PM count in the exhaust gas flowing out from the exhaust gas purification filter. The measurement conditions were a temperature of 450° C., and an exhaust gas flow rate of 2.76 m$^3$/min. The size of the filter used in the measurement had a diameter of 132 mm, an axial direction length of 100 mm, and a dividing wall thickness of 200 μm. The measurement was performed for an initial state in which PM was not deposited inside the filter. The measurement of the PM count was performed using a PM particle counter. The relationship between the PM collection rate and the integrated frequency of the pore path length distribution described above is shown in FIG. 16.

<Gas Permeability Coefficient>

First, an exhaust gas purification filter was prepared for each Example and Comparative Example without a plug being formed. That is to say, exhaust gas purification filters not having a plug formed on an end surface, and having cells which are open at both end surfaces, were prepared. The gas permeability coefficient measurement used an exhaust gas purification filter having a cylindrical shape with a diameter of 30 mm, an axial direction length of 25 mm, and a dividing wall thickness of 200 μm. Such an exhaust gas purification filter having an outer dimension smaller than that of an actual product used for on-board use or the like can be obtained by cutting out a filter having the desired dimensions from an actual product. After being cut out, for example, the casing of the filter can be formed by cementing.

Figure 17:
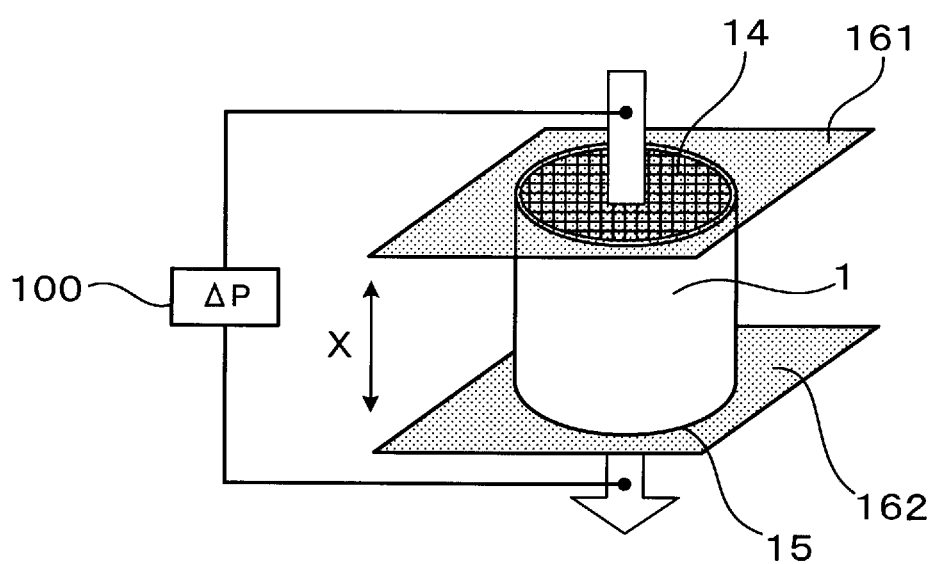
FIG. 17 is a schematic diagram showing a measurement method of the gas permeability coefficient of the exhaust gas purification filter according to the second embodiment.

Next, as illustrated in FIG. 17, polyester tapes 161 and 162 were attached to both end surfaces 14 and 15 in the axial direction x of the exhaust gas purification filter 1. Then, the polyester tapes 161 and 162 were partially removed, for example, using a soldering iron so that alternating plugs equivalent to that of the first embodiment were formed by the polyester tapes 161 and 162.

Figure 18A:
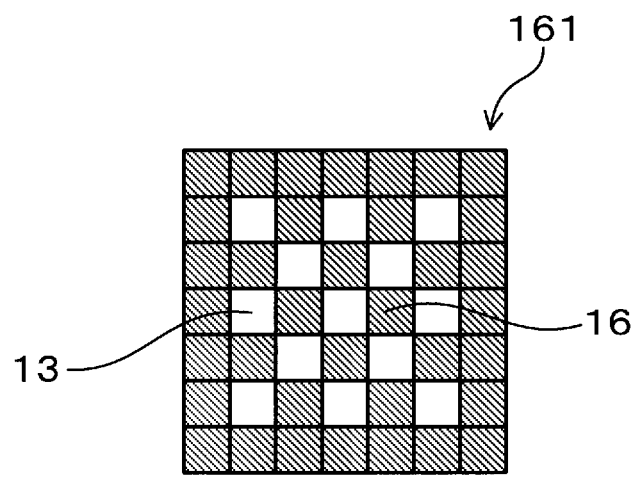
FIG. 18A is a diagram showing a plug-forming tape which is attached to an upstream side end surface of the exhaust gas purification filter.
Figure 18B:
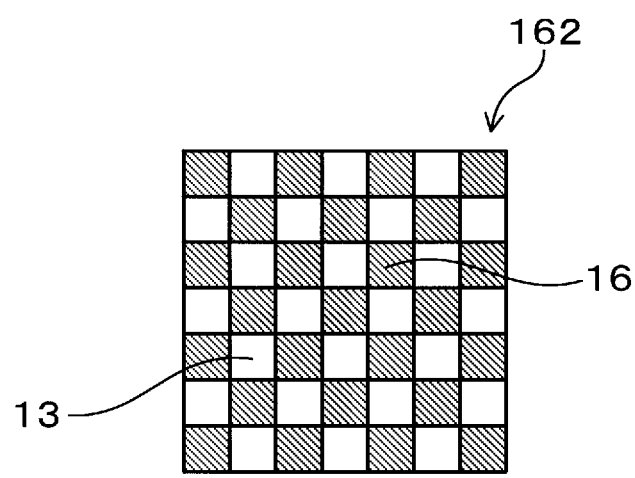
FIG. 18B is a diagram showing a plug-forming tape which is attached to a downstream side end surface of the exhaust gas purification filter according to the second embodiment.

In this manner, as illustrated in FIG. 18A, the first end surface 14, which is the upstream side end surface, has 13 cells 13 which are open, and the remaining cells 13 are closed by a plug 16 composed of the tape 161. On the other hand, as illustrated in FIG. 18B, the second end surface 15, which is the downstream side end surface, has 25 cells 13 which are open, and the remaining cells 13 are closed by a plug 16 composed of the tape 162. That is to say, a plug 16 composed of polyester tape was formed instead of a plug composed of ceramic as in the first embodiment. In the present embodiment, a filter in which the plug 16 is formed using the polyester tapes 161 and 162 was used in the gas permeability coefficient measurement, however an equivalent result can also be obtained if a filter formed using a plug made of ceramic is used as in the first embodiment.

Figure 19:
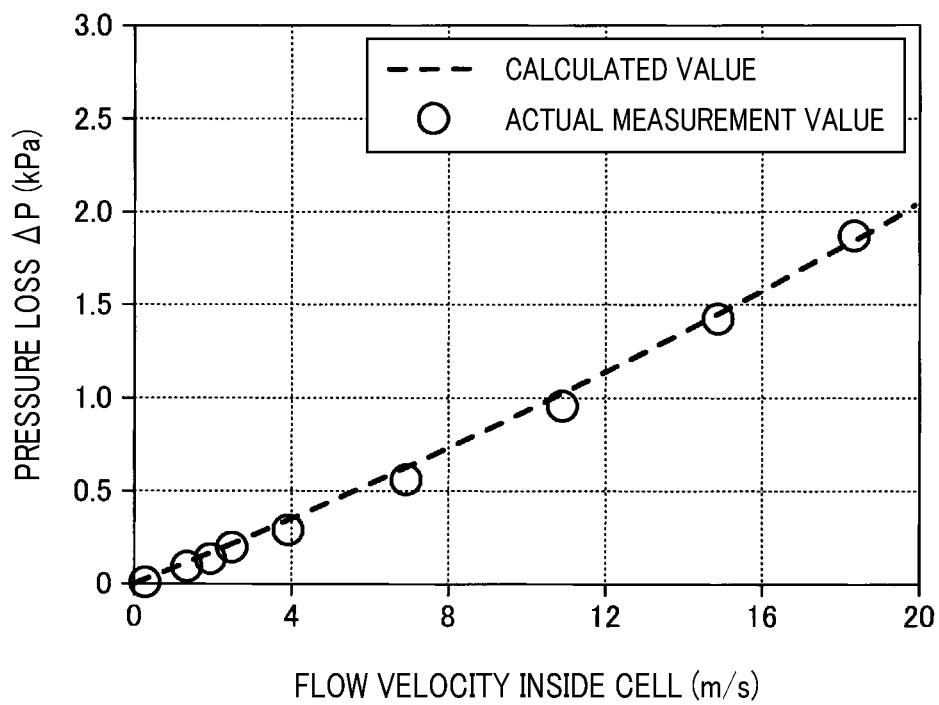
FIG. 19 is a diagram showing an example of the relationship between the flow velocity inside a cell and the pressure loss of the exhaust gas purification filter according to the second embodiment.

Then, as illustrated in FIG. 17, gas was flowed from the first end surface 14 of each exhaust gas purification filter 1 toward the second end surface 15, and the relationship between the gas flow velocity and the pressure loss was measured using a perm porometer 100. Specifically, the pressure loss was measured when the flow velocity was changed. The arrow in FIG. 17 indicates the gas flow direction. A CEP-1100AXSHJ manufactured by Porous Materials Inc. was used as the perm porometer 100. An example of the relationship between the gas flow velocity and the pressure loss is shown in FIG. 19. The points plotted in FIG. 19 indicate actual measurement values obtained using the perm porometer 100, and the broken line represents calculated values obtained using expressions (i) to (viii) described below. The expressions (i) to (viii) will be described below. The pressure loss of the filter, $\Delta P$ (unit: Pa); the sum of the condensation pressure loss $\Delta P_{inlet}$ when gas flows into the cells 13 and the expansion pressure loss $\Delta P_{exit}$ when gas flows out of the cells 13, $\Delta P_{inlet/exit}$ (unit: Pa); the pressure loss resulting from gas passing through the inside of the cells 13, $\Delta P_{channel}$ (unit: Pa); and the pressure loss resulting from gas passing through the dividing wall, $\Delta P_{wall}$ (unit: Pa); satisfy the relationship in expression (i) below.

$$\Delta P = \Delta P_{inlet/exit} + \Delta P_{channel} + \Delta P_{wall} \qquad (i)$$

Furthermore, $\Delta P_{inlet/exit}$; the open area of the cells, $A_{open}$ (unit: m²); the open area of the cells on the first end surface serving as the gas inlet end surface, $A_{in}$ (unit: m²); the gas flow velocity inside the cells, $V_{channel}$ (unit: m/s); and the air density, $\rho$ (unit: kg/m³); satisfy the relationship in expression (ii) below.

[Equation 1]

$$\Delta P_{inlet/exit} = \left(1 - \frac{A_{open}}{A_{in}}\right)^2 \cdot \frac{1}{2}\rho V_{channel}^2 + \left(0.04 - \left(\frac{1}{0.582 + \frac{0.0418}{1.1 - \left(\frac{A_{open}}{A_{in}}\right)^{-0.5}}}\right)\right)^2 \cdot \frac{1}{2}\rho V_{channel}^2 \qquad (ii)$$

Moreover, $\Delta P_{channel} + \Delta P_{wall}$; the gas permeability coefficient, k (unit: m²); the axial direction length of the exhaust gas purification filter, L (unit: m); the cell hydraulic diameter, $a_1$ (unit: m); the dividing wall thickness, w (unit: m); the friction coefficient inside the cell, F (unit: unitless); the Reynolds number (unit: unitless); the gas viscosity, $\mu$ (unit: Pa·s); and the gas flow velocity inside the cell, $V_{channel}$ (unit: m/s); satisfy the relationships in expression (iii) to expression (viii) below. In expression (iii), e is the exponential function, exp.

[Equation 2]

$$\Delta P_{channel} + \Delta P_{wall} = \left\{\frac{(e^{g_1}+1)(e^{g_2}+1)(g_2-g_1)}{4(e^{g_2}-e^{g_1})} + \frac{A_2}{2}\right\} \cdot \frac{\mu V_{channel} a_1 w}{4Lk} \qquad (iii)$$

[Equation 3]

$$g_1 = A_1 - \sqrt{A_1^2 + 2A_2} \qquad (iv)$$

[Equation 4]

$$g_2 = A_1 + \sqrt{A_1^2 + 2A_2} \qquad (v)$$

[Equation 5]

$$A_1 = \frac{k}{a_1 w} \frac{4L}{a_1} Re \qquad (vi)$$

[Equation 6]

$$A_2 = \frac{4Fk}{a_1 w}\left(\frac{L}{a_1}\right)^2 \qquad (vii)$$

[Equation 7]

$$Re = \frac{\rho V_{channel} a_1}{\mu} \qquad (viii)$$

The pressure loss values were calculated based on the expressions (i) to (viii) above. The result is shown as the broken line in FIG. 19. That is to say, the broken line represents pressure loss values obtained by calculations. As can be seen in expressions (i) to (viii), with the exception of the gas permeability coefficient k, the pressure loss value is calculated by measurement of the filter length L, the open area of the cells $A_{open}$, the hydraulic diameter $a_1$, and the dividing wall thickness w, and this value does not change even when the gas flow velocity is changed. Therefore, the relationship represented by the broken line shown in FIG. 19 can be derived by inputting an arbitrary value for the gas permeability coefficient.

For example, if a large value is input for the gas permeability coefficient, the pressure loss value becomes lower than the actual measurement value, and the calculated value indicated by the broken line falls below the actual measurement value. On the other hand, if a small value is input for the gas permeability coefficient, the calculated value indicated by the broken line exceeds the actual measurement value. Therefore, in order to approximate the calculated value to be as close as possible to the actual measurement value, the gas permeability coefficient k was calculated by the least squares method such that the difference between the calculated value and the actual measurement value was minimized. This calculated value is the gas permeability coefficient k in the present specification. That is to say, the gas permeability coefficient k is a value obtained by reverse calculation of the gas permeability coefficient from the actual measurement values of the pressure loss measured by a perm porometer using the expressions (i) to (viii).

<Average Pore Size and Porosity>

The average pore size and the porosity were measured by a mercury porosimeter using the principles of the mercury intrusion method. The AutoPore IV 9500 manufactured by Shimadzu Corp. was used as the mercury porosimeter. The measurement conditions were as follows.

First, a test piece was cut out from the filter. The test piece had a rectangular parallelepiped shape having axial direction and orthogonal direction dimensions of height 15 mm×width 15 mm, and an axial direction length of 20 mm. Next, the test piece was accommodated inside the measurement cell of the mercury porosimeter, and the pressure inside the measurement cell was reduced. Then, mercury was introduced and pressurized inside the measurement cell, and the porosity and the pore volume was measured from the pressure at the time of pressurization and the volume of mercury introduced into the pores of the test piece.

The measurement was performed over a pressure range of 0.5 to 20,000 psia. Note that 0.5 psia corresponds to $0.35 \times 10^{-3}$ kg/mm², and 20,000 psia corresponds to 14 kg/mm². The range of pore sizes corresponding to this pressure range is 0.01 to 420 μm. A contact angle of 140° and a surface tension of 480 dyn/cm were used as constants when calculating the pore size from the pressure. The average pore size refers to the pore size at a pore volume integrated value of 50%. The porosity was calculated according to the following relational expression. The true specific gravity of cordierite is 2.52.

Porosity (%)=Total pore volume/(total pore volume+ 1/true specific gravity of cordierite)×100

TABLE 4

| Example, Comparative Example No. | Three-peak integrated frequency (%) in pore path length distribution (histogram) | Collection rate (%) | Gas permeability coefficient (×10⁻¹² m²) | Average pore size (μm) | Porosity (%) |
| --- | --- | --- | --- | --- | --- |
| Comparative Example 1 | 49.0 | 56 | 0.85 | 25 | 59 |
| Comparative Example 2 | 37.4 | 54 | 1.09 | 30 | 63 |
| Example 1 | 58.0 | 60 | 1.36 | 19 | 66 |
| Example 2 | 83.0 | 83 | 1.63 | 14 | 65 |
| Example 3 | 70.6 | 71 | 1.95 | 17 | 65 |
| Example 4 | 74.6 | 75 | 1.42 | 16 | 65 |
| Example 5 | 63.1 | 63 | 1.22 | 18 | 60 |

Figure 16:
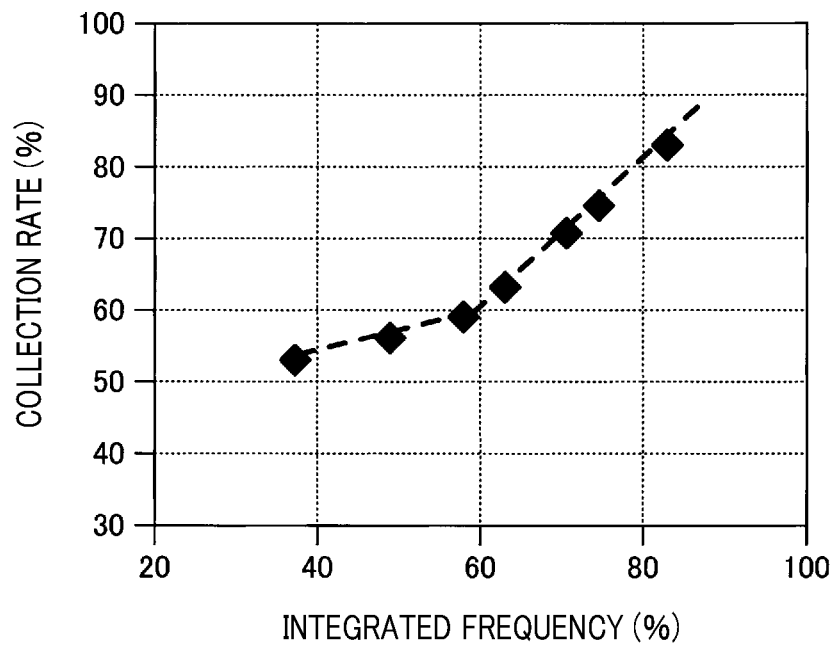
FIG. 16 is a diagram showing the relationship between the integrated frequency and the collection rate according to the second embodiment.

As can be seen in Table 4, even when the gas permeability coefficient is increased by increasing the integrated frequency in the frequency histogram of the path length distribution, the collection rate can be sufficiently increased. As shown in FIG. 16, a remarkable improvement in the collection rate is achieved by making the integrated frequency at least 58% as in Examples 1 to 5. This is considered to be because the uniformity of the pores improves, which increases the pores 121 that serve as exhaust gas flow paths inside the dividing wall 12 and are effectively used for PM collection, and makes the gas flow velocity accordingly more uniform.

On the other hand, if the integrated frequency falls below 58% as in Comparative Examples 1 and 2, the collection rate is low because, in contrast to the Examples, the flow of the exhaust gas concentrates in the pores 12 having a short path length, through which the gas flows more easily. The reason that the slope of the relationship between the Comparative Examples is more gradual in FIG. 16 is considered to be the following. In Comparative Example 1 and Comparative Example 2, the gas flow velocity becomes higher overall due to a concentration of the gas flow. Further, the concentration of the gas flow is unchanged even when the pore size distribution changes as in Comparative Example 1 and Comparative Example 2, and the slope is considered to be more gradual because a large change in the flow velocity is not observed.

Therefore, in the manner of Examples 1 to 5, it is preferable for the maximum value of the values obtained by summing the frequencies of a total of three adjacent path length levels in the frequency histogram of the pore path length distribution which include the maximum peak frequency to be at least 58%. In Examples 1 to 5, because there is one maximum peak, the integrated frequency obtained by summing the maximum peak frequency and the frequencies of the two path length levels adjacent to the maximum peak frequency is made at least 58%. As a result, in the exhaust gas purification filter 1, because the pores 121 that are effectively used for PM collection increase and the gas flow velocity becomes uniform, the exhaust gas purification filter is capable having both a low pressure loss and a high collection rate at a high level.

As can be seen in FIG. 9 to FIG. 15, Table 4, and FIG. 16, the uniformity of the path length distribution is high in the exhaust gas purification filter, and it can be seen that the collection rate improves as the integrated frequency described above increases. Next, production conditions that enable the pore path length distribution to be made more uniform are investigated as follows.

Because silica and talc melt at high temperatures and are capable of forming pores, they can be referred to as pore forming materials. It is thought that the contact between particles improves as the particle number ratio of the pore forming material increases, which enables the pore path length to be made uniform.

Further, when the clay including the cordierite raw material is extrusion molded, the particle number ratio of the silica and talc included in the clay is controlled. The cordierite raw material is a raw material such as silica, talc and an Al source, which is capable of forming a cordierite composition upon sintering.

However, the particle number ratio is difficult to measure, and further, variations in the measured value are expected depending on the molding conditions. Therefore, an index is desired that enables the path length distribution to be adjusted by controlling the conditions of raw material powders, such as silica, talc, and an Al source. An evaluation method which simulates the clay was investigated from this perspective by measuring the pressurized bulk densities of the raw material powders.

Specifically, a mixed powder of the raw material powders was firstly placed inside a 25 mm diameter and 20 mm long measurement unit of an "Autograph" pressurization measurement instrument manufactured by Shimadzu Corp., and pressurization of the mixed powder was then started. The pressurization rate was 1 mm/min. After a load of 7 kN was reached, which corresponds to a pressure of 15 MPa, the pressurization was stopped by a limit control. A cylindrical pellet composed of the mixed powder was obtained as a result of the pressurization. The weight and height of the pellet were measured.

The height measurement of the pellet can be performed by a vernier caliper, a micrometer, a three-dimensional measurement device, or the like. Here, the measurement was performed using a micrometer. Since the diameter of the pellet is 25 mm, the volume of the pellet was calculated from the product of the diameter and the height.

Furthermore, the density was calculated from the volume and weight of the pellet. The density was calculated by dividing the weight by the volume. The density was taken as the pressurized bulk density. Note that methyl cellulose "65MP-4000" manufactured by Matsumoto Yushi Seiyaku Co., Ltd. was added to the mixed powder of the raw materials as a binder. The binder enables the pellet-form mixed powder to be more easily handled, and other binders can also be used. Specifically, 1.5 g of the raw material powder and 0.5 g of the binder were used, giving a total of 2 g.

In general, a correlation exists between the particle size and the bulk density, in which a reduction in particle size results in the formation of a larger amount of space between the particles, which leads to a smaller bulk density. The number of particles arranged in a certain volume increases as the particle diameter is reduced. Therefore, as the bulk density becomes smaller, the number of particles increases. That is to say, the bulk density and the number of particles are inversely related.

The particle number ratio R of the pore forming material in the mixed powder is calculated using expression (x) below from the number of particles of silica and talc, $N_{ST}$, and the number of particles in the entire raw material mixed powder used to produce the exhaust gas purification filter, $N_M$.

$$R = N_{ST}/N_M \quad \text{(x)}$$

When the relationship between the bulk density and the number of particles described above is applied to expression (x), the particle number ratio R of the pore forming material is described by expression (xi) below from the pressurized bulk density of the entire raw material mixed powder, $\rho_M$, and the pressurized bulk density of the silica and talc mixed powder, $\rho_{ST}$.

$$R = \rho_M/\rho_{ST} \quad \text{(xi)}$$

In the present embodiment, because the raw material mixed powder includes silica, talc, and aluminum hydroxide, the pressurized bulk density $\rho_M$ is the pressurized bulk density of a mixed powder of silica, talc, and aluminum hydroxide. Therefore, the particle number ratio R can be increased by increasing the pressurized bulk density of aluminum hydroxide, or reducing the pressurized bulk density of the silica and talc mixed powder.

Further, using the pressurized bulk density of aluminum hydroxide, $\rho_A$, and the particle number ratio R of the pore forming material composed of silica and talc as an index, $\rho_A/\rho_{ST}$ was calculated. The pressurized bulk densities were measured according to the method described above. The results are shown in Table 5.

Table 6 shows the bulk densities of the porous silica and fused silica used in the Examples and Comparative Examples obtained by a tap denser. The measurement is performed using a tap density method fluid adhesion measurement device. Specifically, a tap denser manufactured by Seishin Enterprise Co., Ltd. was used. Further, the silica used in the Examples and Comparative Examples, which represent the measurement target powders, was used to fill the cylinder of the measurement device. Next, the silica was pressurized by tapping, and the bulk density was calculated from the mass of the silica and the volume of the cylinder in the pressurized state. The results are shown in Table 6.

TABLE 5

|  | Example No. | | | | |
| --- | --- | --- | --- | --- | --- |
|  | Example 1 | Example 2 | Example 3 | Example 4 | Example 5 |
| Pressurized bulk density of porous silica and talc mixed raw material, $\rho_{ST}$ (g/cm³) | 0.91 | 0.76 | 0.79 | 0.79 | 0.91 |
| Pressurized bulk density of aluminum hydroxide, $\rho_A$ (g/cm³) | 1.42 | 1.56 | 1.56 | 1.56 | 1.42 |
| Particle number ratio of porous silica and talc, $\rho_A/\rho_{ST}$ (%) | 1.56 | 2.05 | 1.97 | 1.97 | 1.56 |

TABLE 6

|  | Example, Comparative Example No. | | | | | | |
| --- | --- | --- | --- | --- | --- | --- | --- |
|  | Example 1 | Example 2 | Example 3 | Example 4 | Example 5 | Comparative Example 1 | Comparative Example 2 |
| Silica type | Porous silica A | Porous silica B | Porous silica C | Porous silica B | Porous silica A | Fused silica A | Fused silica B |
| Bulk density measured by tap denser (g/cm³) | 0.51 | 0.22 | 0.26 | 0.22 | 0.51 | 1.35 | 1.38 |

As can be seen in Table 5 and Table 6, in Examples 2 to 4, a porous silica B and a porous silica C is used which has a low bulk density as measured by the tap denser. In Examples 2 to 4, it can be seen that the pressurized bulk density of the silica and talc mixed powder, $\rho_{ST}$, is low.

Furthermore, by using aluminum hydroxide composed of both a large diameter power having a relatively large average particle size, and a small diameter powder having a relatively small average particle size, the filling characteristics improve and the bulk density of the aluminum hydroxide increases. It is generally considered that, for aluminum hydroxide composed of a large diameter powder and a small diameter powder, adjustment of the mixing ratio of the small diameter powder to 5 to 35 mass % is suitable for improving the filling characteristics.

However, the optimal mixing ratio between the large diameter powder and the small diameter powder changes depending on the combination of particle sizes, particle shapes, and distributions and the like. As shown in Table 1, aluminum hydroxide having an average particle size of 5 μm is used alone in Example 1 and Example 5. In Example 2 and Example 3, a mixed powder is used in which a small diameter powder of aluminum hydroxide having an average particle size of 3 μm, and a large diameter powder of aluminum hydroxide having an average particle size of 8 μm are mixed in a small diameter powder-to-large diameter powder ratio of 3:7. In Example 4, a mixed powder is used in which a small diameter powder of aluminum hydroxide having an average particle size of 3 μm, and a large diameter powder of aluminum hydroxide having an average particle size of 8 μm are mixed in a small diameter powder-to-large diameter powder ratio of 5:5.

As can be seen in Table 5, such combinations of particle sizes of aluminum hydroxide lead to approximately equivalent pressurized bulk densities when the mixing ratio of the small diameter powder is 30 to 50 mass %. It can be seen that in Examples 2 to 4, the pressurized bulk density has increased compared to cases such as Examples 1 and 5, where aluminum hydroxide having different average particle sizes is not blended and a single type is used.

As can be seen in Table 5, as a result of calculating the particle number ratio of silica and talc from the pressurized bulk density in each Example, the relationship between the magnitudes of the particle number ratios is represented by Example 1 and Example 5<Example 3 and Example 4<Example 2. As shown in Table 3 and FIG. 16, this coincides with the order described above for the integrated frequencies of the pore path length distributions and the collection rates. Therefore, better results in terms of performance are considered to be obtained as the particle number ratio of silica and talc is increased. That is to say, it is preferable to reduce the pressurized bulk density of aluminum hydroxide, and to increase the pressurized bulk density of the porous silica and talc mixture. As a result, the integrated frequency of the pore path length distribution of the exhaust gas purification filter can be increased, which enables the gas permeability coefficient to be increased, and the collection rate to be increased.

Furthermore, in the present embodiment, the particle number ratio of silica and talc in the pore forming material was calculated by (pressurized bulk density of aluminum hydroxide, $\rho_A$)/(pressurized bulk density of the silica and talc mixed raw material $\rho_{ST}$), however the pressurized bulk density of the entire cordierite raw material may also be used instead of the pressurized bulk density of aluminum hydroxide. That is to say, the particle number ratio of silica and talc in the pore forming material may also be calculated by (pressurized bulk density of the cordierite raw material, $\rho_M$)/(pressurized bulk density of the silica and talc mixed raw material, $\rho_{ST}$).

Specifically, for example, when kaolin or alumina is used as the cordierite raw material, the pressurized bulk density of a mixed powder including these can be used. Furthermore, when a pore forming material is used, it is possible to use the pressurized bulk density of a mixed powder including the pore forming material. Furthermore, in cases where it is acceptable for the porosity of the dividing wall to decrease, it is possible for alumina having a different average particle size to aluminum hydroxide to be added to the aluminum hydroxide mixture. In the aluminum hydroxide and alumina mixture, it is possible to use aluminum hydroxide having one type of average particle size, or to use two or more types of average particle sizes in combination. The same applies to alumina. Furthermore, it is possible to use alumina instead of aluminum hydroxide as the Al source. These combinations may be appropriately selected from the perspective of moldability, shrinkage ratio, cost, and the like.

Third Embodiment

The present embodiment is an example in which a plurality of exhaust gas purification filters are produced to investigate preferable relationships between the gas permeability coefficient and the collection rate. First, as shown in Table 7, clays containing the cordierite raw material were produced by mixing fused silica, talc, aluminum hydroxide, a pore forming material composed of graphite, and the like.

The clays were molded in the same manner as in the first embodiment, and the exhaust gas purification filters were obtained following sintering and the formation of a plug. Sintering was performed under conditions in which the maximum heating temperature during sintering was 1,430° C., and the retention time at the maximum heating temperature was 20 hours. The eight types of exhaust gas purification filters, Samples 1 to 8, were obtained in this manner.

The filter shape was a cylindrical shape having a diameter of 132 mm and a length of 100 mm. Furthermore, the thickness of the dividing wall was 0.20 mm, and the cell pitch was 1.47 mm. The cell pitch may also be expressed as 8 mil/300 cpsi. Note that "mil" represents 1/1000 inch, and "cpsi" represents the number of cells per square inch.

TABLE 7

| | Sample 1 | | Sample 2 | | Sample 3 | | Sample 4 | |
|---|---|---|---|---|---|---|---|---|
| | Average particle size (μm) | Mixing ratio (wt. %) | Average particle size (μm) | Mixing ratio (wt. %) | Average particle size (μm) | Mixing ratio (wt. %) | Average particle size (μm) | Mixing ratio (wt. %) |
| Dissolved silica | 12 | 19.4 | 15 | 19.4 | 20 | 19.4 | 20 | 19.4 |
| Talc | 14 | 35.4 | 14 | 35.4 | 20 | 35.4 | 35 | 35.4 |
| Aluminum hydroxide | 5 | 45.2 | 5 | 45.2 | 5 | 45.2 | 5 | 45.2 |
| Methylcellulose | — | 7 | — | 9 | — | 9 | — | 9 |

TABLE 7-continued

| | | | | | | | | |
|---|---|---|---|---|---|---|---|---|
| Graphite | 25 | 0 | 25 | 20 | 25 | 20 | 25 | 20 |
| Lubricating oil | — | 5.5 | — | 5.5 | — | 5.5 | — | 5.5 |
| Water | — | 29.1 | — | 34 | — | 34 | — | 34 |

| | Sample 5 | | Sample 6 | | Sample 7 | | Sample 8 | |
|---|---|---|---|---|---|---|---|---|
| | Average particle size (μm) | Mixing ratio (wt. %) | Average particle size (μm) | Mixing ratio (wt. %) | Average particle size (μm) | Mixing ratio (wt. %) | Average particle size (μm) | Mixing ratio (wt. %) |
| Dissolved silica | 30 | 19.4 | 30 | 19.4 | 45 | 19.4 | 52 | 19.4 |
| Talc | 35 | 35.4 | 35 | 35.4 | 40 | 35.4 | 40 | 35.4 |
| Aluminum hydroxide | 5 | 45.2 | 8 | 45.2 | 8 | 45.2 | 10 | 45.2 |
| Methylcellulose | — | 7 | — | 9 | — | 9 | — | 9 |
| Graphite | 25 | 20 | 25 | 20 | 25 | 20 | 25 | 20 |
| Lubricating oil | — | 5.5 | — | 5.5 | — | 5.5 | — | 5.5 |
| Water | — | 34 | — | 34 | — | 34 | — | 34 |

The average pore size, the porosity, the gas permeability coefficient, and the PM collection rate were measured for each sample in the same manner as the second embodiment. The gas permeability coefficient refers to the value obtained by reverse calculation from the actual measured value of the pressure loss as shown in the second embodiment. The results are shown in Table 8.

TABLE 8

| | Sample No. | | | | | | | |
|---|---|---|---|---|---|---|---|---|
| | Sample 1 | Sample 2 | Sample 3 | Sample 4 | Sample 5 | Sample 6 | Sample 7 | Sample 8 |
| Average pore size (μm) | 10 | 12 | 15 | 18 | 20 | 25 | 30 | 35 |
| Porosity (%) | 50 | 57 | 59 | 60 | 61 | 59 | 63 | 62 |
| Gas permeability coefficient ($\times 10^{-12}$ m$^2$) | 0.24 | 0.48 | 0.60 | 0.71 | 0.78 | 0.85 | 1.09 | 1.30 |
| PM collection rate (%) | 82 | 78 | 71 | 68 | 62 | 56 | 54 | 42 |

Figure 20:
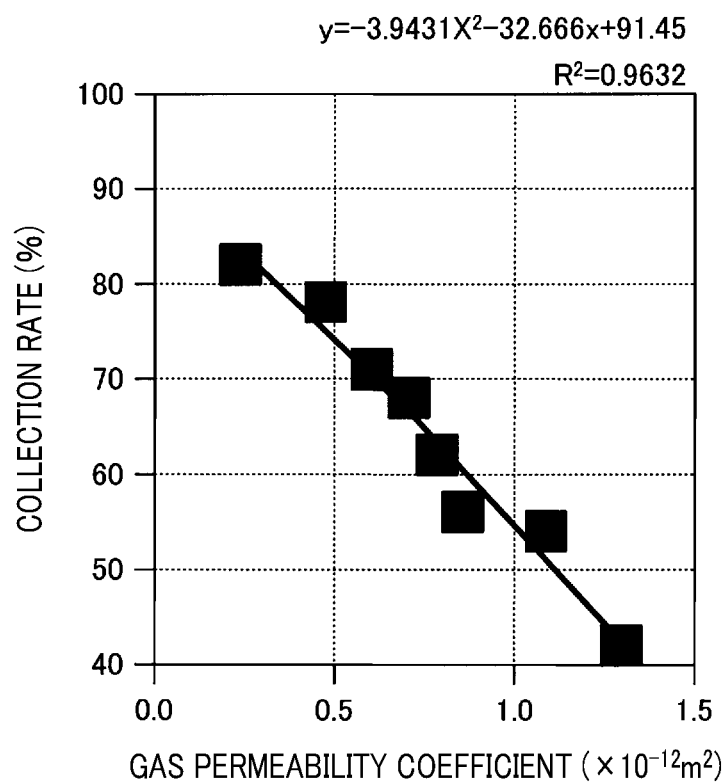
FIG. 20 is a diagram showing the relationship between the gas permeability coefficient and the collection rate of the exhaust gas purification filters of Samples 1 to 8 obtained using fused silica according to a third embodiment.

Furthermore, the relationship between the gas permeability coefficient to and the collection rate is shown in FIG. 20. The line shown in FIG. 20 is expressed by the multiple regression expression (I), $y = -3.9431x^2 - 32.666x + 91.45$. Here, x is the gas permeability coefficient, and y is the collection rate.

The Samples 1 to 8 are exhaust gas purification filters using fused silica which have non-uniform pore path length distributions. In these cases, as can be seen in Table 8, there is a tendency for the PM collection rate to decrease when the gas permeability coefficient is increased, and a tendency for the gas permeability coefficient to decrease when the PM collection rate is increased.

These tendencies are also clear from FIG. 20, and there is a correlation between the gas permeability coefficient and the collection rate. That is to say, the gas permeability coefficient depends on the pore size and the porosity. As the pore size is made larger and the porosity increases, the gas permeability coefficient increases. On the other hand, the gas permeability coefficient increases, the pore size becomes larger. Therefore, the PM more easily slips through, and the collection rate decreases.

Therefore, an exhaust gas purification filter is preferable in which the collection rate A and the gas permeability coefficient k satisfy the relationship in expression (II) below. In this case, the collection rate can be increased from the trade-off line expressed by the multiple regression expression (I) above. That is to say, the gas permeability coefficient can be made higher, and the collection rate can be made higher.

$$A > -3.94k^2 - 32.67k + 91.45 \quad \text{(II)}$$

Figure 21:
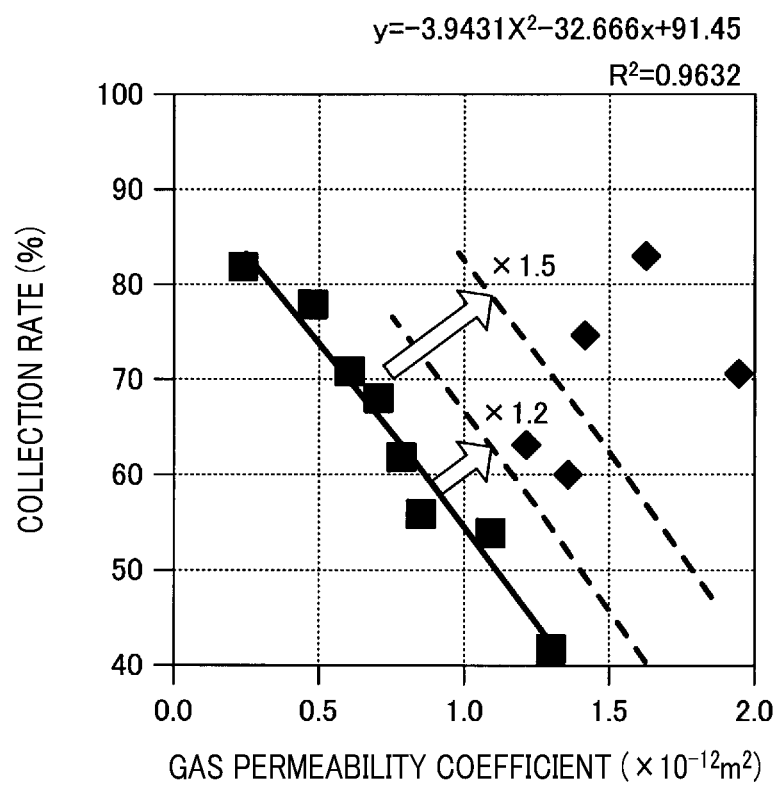
FIG. 21 is a diagram showing the relationship between the gas permeability coefficient and the collection rate of the exhaust gas purification filters of Samples 1 to 8, and Examples 1 to 5 according to the third embodiment.

FIG. 21 shows a diagram in which the relationship between the gas permeability coefficient and the collection rate in the exhaust gas purification filters of Examples 1 to 5 in the second embodiment is plotted together with the relationship between the gas permeability coefficient and the collection rate of the samples 1 to 8 shown in FIG. 20. As shown in FIG. 21, in Examples 1 to 5, in which the integrated frequency of the pore path length distribution is made at least 58% as described above, the collection rate has improved relative to the trade-off line expressed by the multiple regression expression (I). That is to say, expression (II) is satisfied.

Furthermore, as can be seen in FIG. 21, in Example 1 and Example 5, which have integrated frequencies in a range of 58 to 65%, the collection rate has improved relative to the trade-off line of expression (I) by a factor of at least 1.2 at the same gas permeability coefficient. On the other hand, in Examples 2 to 4, which have integrated frequencies of at least 70%, the collection rate has improved relative to the trade-off line of expression (I) by a factor of at least 1.5 at the same gas permeability coefficient.

The exhaust gas purification filters were coated with a slurry containing a catalyst, such as a noble metal, thereby loading the catalyst. At this time, some of the pores became closed due to the catalyst particle size, the slurry viscosity the loading amount, the flow velocity conditions of the slurry at the time of coating, and the like, and the collection rate decreased. In particular, when the effect of the loading amount was large and the loading amount was less than 100 g/L, the collection rate decreased to approximately ⅘ compared to that before loading, and there was a tendency at or above 100 g/L for the collection rate to decrease to approximately ⅔ to ½, or to decrease even further.

From the perspective of meeting enhanced regulations in the future, it is preferable for the PM collection rate after catalyst loading to be at least 50%. That is to say, it is preferable for the PM collection rate before catalyst loading to be at least 60% as in Examples 1 to 5. Furthermore, from the perspective of meeting even stricter regulations in the future, it is preferable for the PM collection rate before catalyst loading to be at least 67% as in Examples 2 to 4.

Furthermore, from the perspective of sufficiently decreasing the pressure loss after catalyst loading, it is preferable for the gas permeability coefficient to be at least $0.8 \times 10^{-12}$ m² as in Examples 1 to 5. It is more preferably at least $1.2 \times 10^{-12}$ m², and even more preferably at least $1.4 \times 10^{-12}$ m².

The embodiments of the present disclosure were described above, however, the present disclosure is in no way limited by the embodiments above, and various embodiments may be applied within a scope that does not depart from the gist thereof.

What is claimed is:

1. An exhaust gas purification filter comprising:
a casing;
a porous dividing wall which partitions the inside of the casing into a honeycomb shape;
and cells enclosed by the dividing wall; wherein
a pore path length distribution of the dividing wall, when expressed by a frequency histogram per 10 μm of the pore path length of the dividing wall, has an integrated frequency of at least 58%, the integrated frequency being a maximum value of a value obtained by summing the frequencies of a total of three adjacent levels which include the maximum peak frequency.

2. The exhaust gas purification filter according to claim 1, wherein
a gas permeability coefficient k of the dividing wall is at least $0.8 \times 10^{-12}$ m².

3. The exhaust gas purification filter according to claim 2, wherein
a particulate matter collection rate A and the gas permeability coefficient k of the exhaust gas purification filter satisfy the relationship in equation (I) below:

$$A > -3.94k^2 - 32.67k + 91.45 \qquad (I).$$